(12) United States Patent
Flack et al.

(10) Patent No.: US 11,628,619 B2
(45) Date of Patent: Apr. 18, 2023

(54) THREE-DIMENSIONAL PRINTING

(71) Applicant: HEWLETT-PACKARD DEVELOPMENT COMPANY, L.P., Spring, TX (US)

(72) Inventors: Kenneth Flack, San Diego, CA (US); Erica Fung, San Diego, CA (US); Carolin Fleischmann, San Diego, CA (US); Jesiska Tandy, San Diego, CA (US); Carmina Querol Esparch, Sant Cugat del Valles (ES); Greg S. Long, Corvallis, OR (US); Ali Emamjomeh, Sant Cugat del Valles (ES); Shannon Reuben Woodruff, San Diego, CA (US); Rachael Donovan, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/864,903

(22) Filed: Jul. 14, 2022

(65) Prior Publication Data

US 2022/0379554 A1     Dec. 1, 2022

Related U.S. Application Data

(62) Division of application No. 16/605,546, filed as application No. PCT/US2018/044593 on Jul. 31, 2018, now Pat. No. 11,426,931.

(51) Int. Cl.
  *B29C 64/165*    (2017.01)
  *B33Y 10/00*    (2015.01)
  (Continued)

(52) U.S. Cl.
  CPC ............ *B29C 64/165* (2017.08); *B33Y 10/00* (2014.12); *B33Y 70/00* (2014.12); *B29K 2023/12* (2013.01);
  (Continued)

(58) Field of Classification Search
  None
  See application file for complete search history.

(56) References Cited

U.S. PATENT DOCUMENTS

| | | | |
|---|---|---|---|
| 6,245,281 B1 | 6/2001 | Scholten et al. | |
| 9,676,952 B2 | 6/2017 | Breton et al. | |

(Continued)

FOREIGN PATENT DOCUMENTS

| | | |
|---|---|---|
| CN | 104559105 A | 4/2015 |
| CN | 105504801 A | 4/2016 |

(Continued)

OTHER PUBLICATIONS

Amado, A. et al., "Advances in Sis Powder Characterization" Aug. 17, 2011, 15 pages.

(Continued)

*Primary Examiner* — Mohammad M Ameen
(74) *Attorney, Agent, or Firm* — Dierker & Kavanaugh, P.C.

(57) ABSTRACT

An example of a three-dimensional (3D) printing kit includes a build material composition and a fusing agent to be applied to at least a portion of the build material composition during 3D printing. The build material composition includes a semi-crystalline or amorphous thermoplastic polymer having a predicted total dimension change during 3D printing ranging from about −4% to about 9%. The fusing agent includes an energy absorber to absorb electromagnetic radiation to coalesce the semi-crystalline or amorphous thermoplastic polymer in the at least the portion. The (Continued)

fusing agent is a core fusing agent and the energy absorber has absorption at least at wavelengths ranging from 400 nm to 780 nm; or the fusing agent is a primer fusing agent and the energy absorber has absorption at wavelengths ranging from 800 nm to 4000 nm and has transparency at wavelengths ranging from 400 nm to 780 nm.

20 Claims, 12 Drawing Sheets

(51) Int. Cl.
  *B33Y 70/00* (2020.01)
  *B29K 23/00* (2006.01)
  *B29K 77/00* (2006.01)
  *B29K 105/00* (2006.01)
(52) U.S. Cl.
  CPC .... *B29K 2077/00* (2013.01); *B29K 2105/005* (2013.01)

(56) References Cited

U.S. PATENT DOCUMENTS

| | | | |
|---|---|---|---|
| 10,814,549 B2 | 10/2020 | Zhao et al. | |
| 2004/0102539 A1 | 5/2004 | Monsheimer et al. | |
| 2004/0106691 A1 | 6/2004 | Monsheimer et al. | |
| 2005/0027050 A1 | 2/2005 | Monsheimer et al. | |
| 2006/0071359 A1 | 4/2006 | Monsheimer et al. | |
| 2009/0236775 A1 | 9/2009 | Monsheimer et al. | |
| 2011/0052927 A1 | 3/2011 | Martinoni et al. | |
| 2011/0237731 A1 | 9/2011 | Paternoster | |
| 2012/0041132 A1 | 2/2012 | Monsheimer et al. | |
| 2014/0371364 A1* | 12/2014 | Monsheimer | C08J 3/14 524/394 |
| 2015/0251353 A1* | 9/2015 | Rodgers | B29C 64/112 264/308 |
| 2015/0259530 A1 | 9/2015 | Rodgers et al. | |
| 2016/0244628 A1 | 8/2016 | Breton et al. | |
| 2017/0021417 A1 | 1/2017 | Martin et al. | |
| 2018/0009982 A1 | 1/2018 | Steele et al. | |
| 2018/0036938 A1 | 2/2018 | Baumann et al. | |
| 2018/0057691 A1 | 3/2018 | Li et al. | |
| 2020/0262146 A1 | 8/2020 | Barnes | |
| 2021/0339467 A1 | 11/2021 | Fleischmann et al. | |

FOREIGN PATENT DOCUMENTS

| | | |
|---|---|---|
| CN | 105884981 A | 8/2016 |
| CN | 106977809 A | 7/2017 |
| CN | 107353644 A | 11/2017 |
| CN | 107698709 A | 2/2018 |
| EP | 2352636 A2 | 8/2011 |
| EP | 2664442 A1 | 11/2013 |
| JP | 2014-178531 A | 9/2014 |
| WO | 2007/114895 A2 | 10/2007 |
| WO | 2010/063691 A2 | 6/2010 |
| WO | 2014/089708 A1 | 6/2014 |
| WO | 2016/175813 A1 | 11/2016 |
| WO | 2017/014784 A1 | 1/2017 |
| WO | 2017/014785 A1 | 1/2017 |
| WO | WO-2017-014 784 A1 * | 1/2017 |
| WO | 2017/069778 A1 | 4/2017 |
| WO | WO-2017-069 778 A1 * | 4/2017 |
| WO | 2017/127061 A1 | 7/2017 |
| WO | 2018/045043 A1 | 3/2018 |
| WO | 2018/080456 A1 | 5/2018 |

OTHER PUBLICATIONS

Ziegelmeierm, Stefan et al., "Characterizing the Bulk & Flow Behaviour of LS Polymer Powders" Aug. 16, 2013, 14 pages.

* cited by examiner

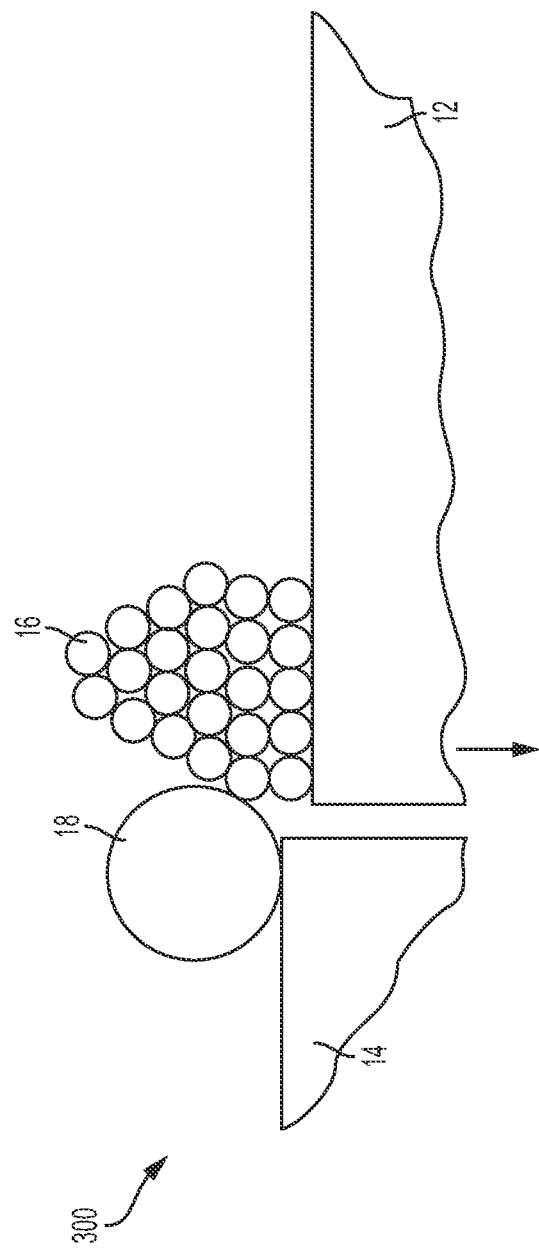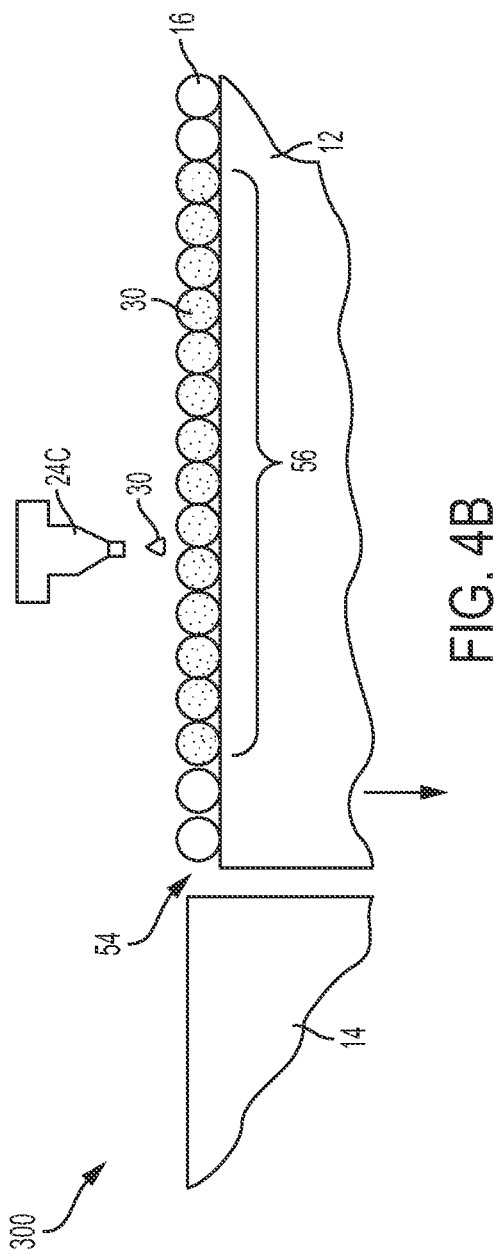

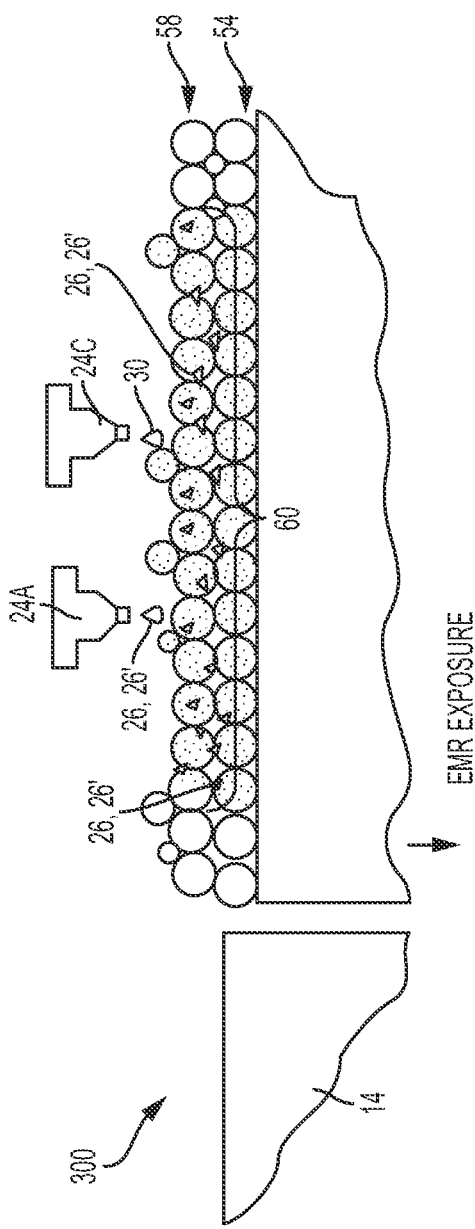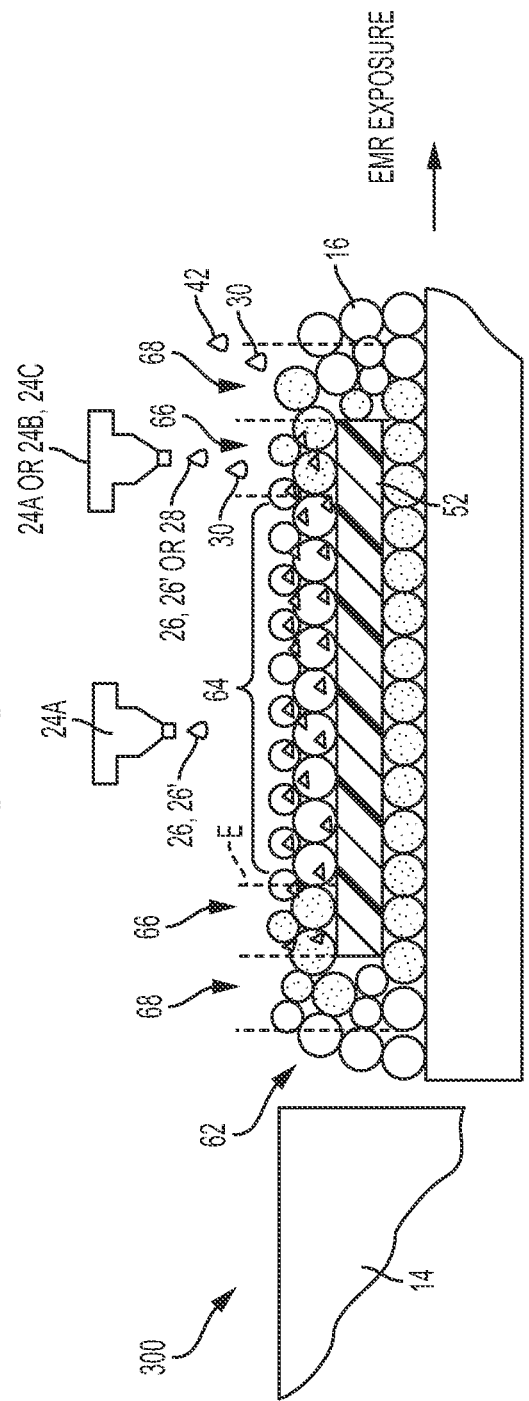

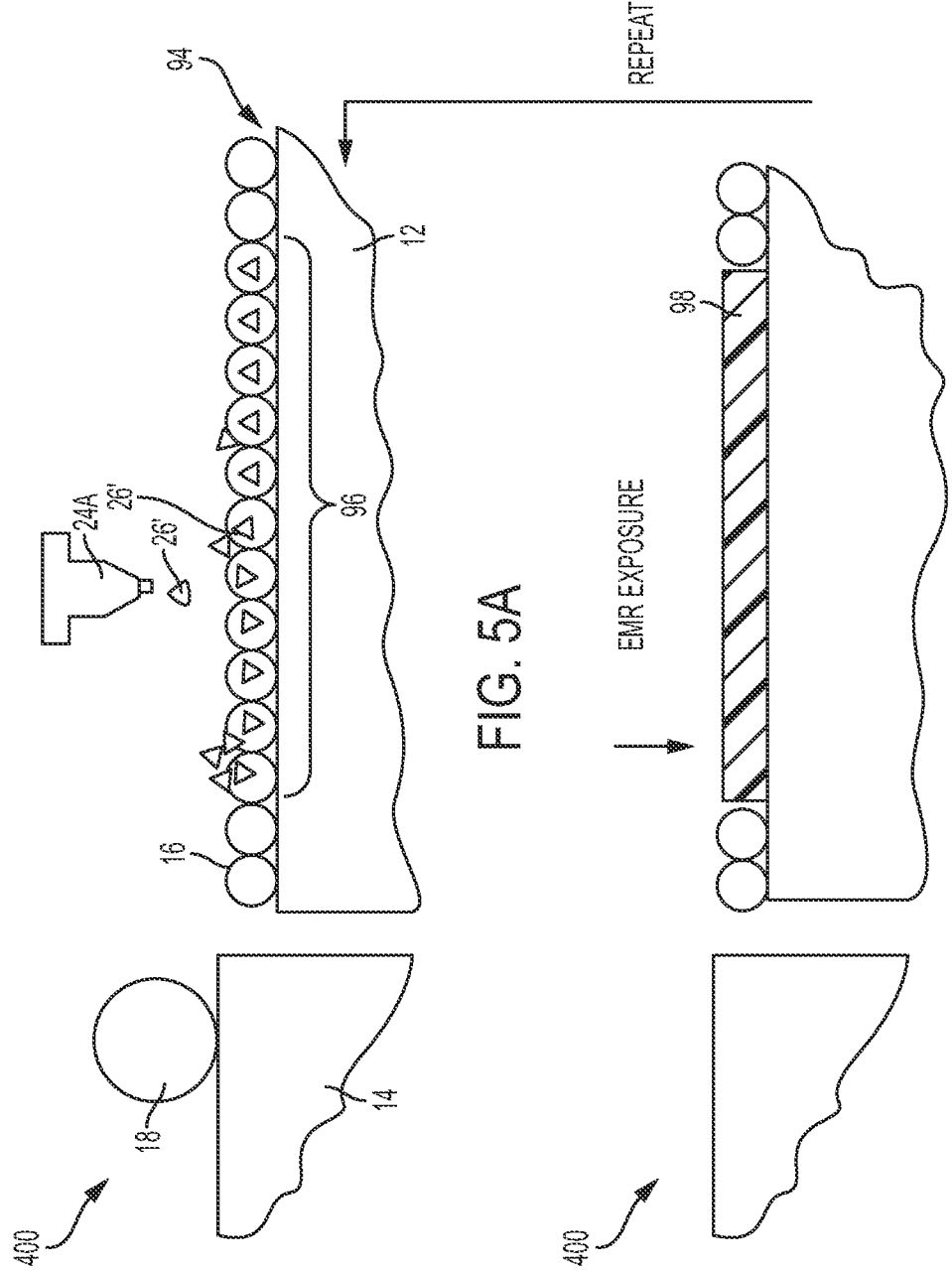

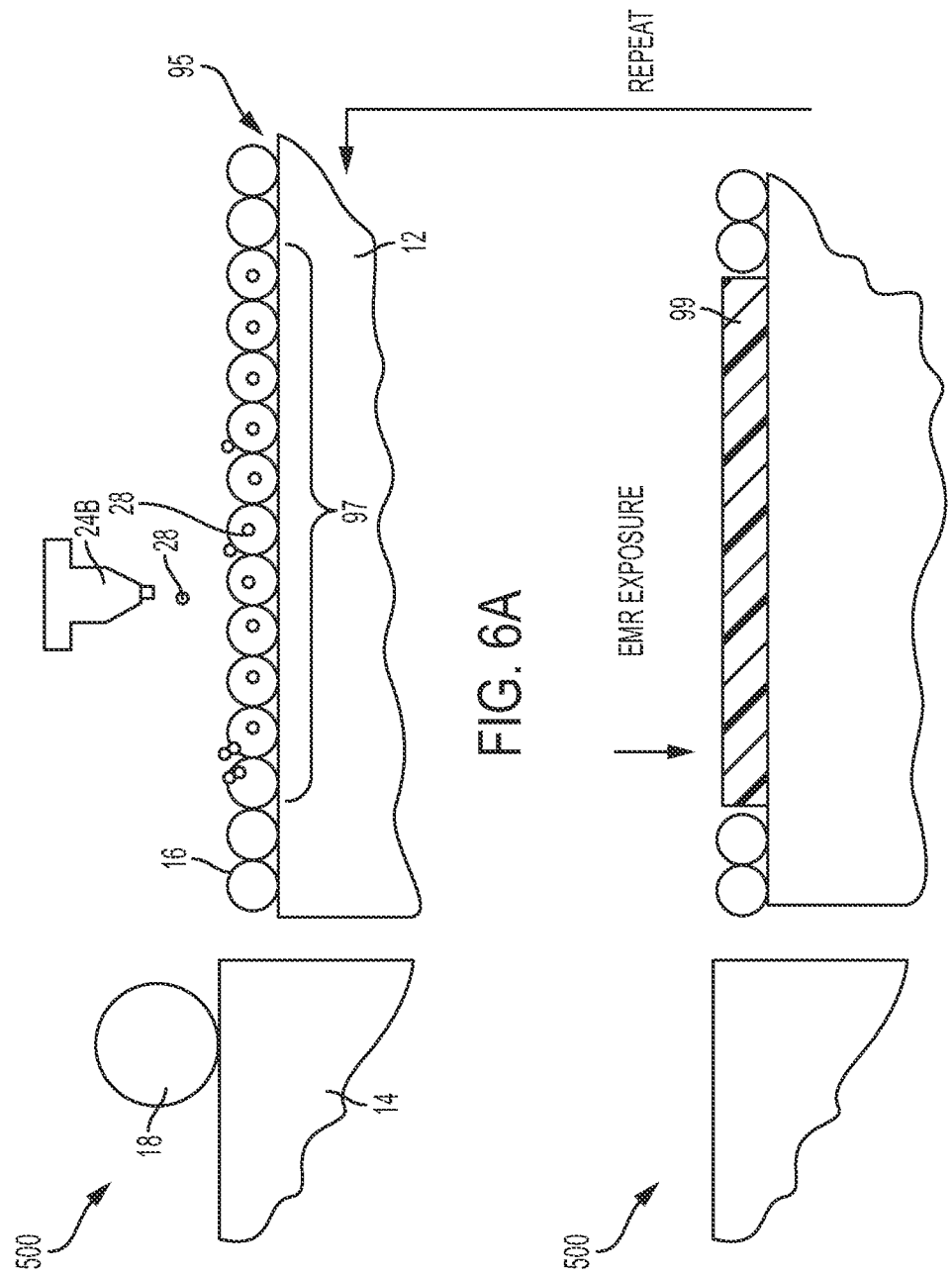

THREE-DIMENSIONAL PRINTING

CROSS-REFERENCE TO RELATED APPLICATIONS

This application is a divisional of U.S. patent application Ser. No. 16/605,546, filed on Oct. 16, 2019, which is a 371(c) National Phase Application of International Application No. PCT/US2018/044593, filed Jul. 31, 2018, all of which are herein incorporated by reference in their entireties.

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material, and the mechanism for material coalescence may depend upon the type of build material used. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 4A through 4H are schematic views depicting the formation of a part using an example of the 3D printing methods disclosed herein;

FIGS. 5A through 5C are schematic views depicting the formation of a part using another example of the 3D printing methods disclosed herein;

FIGS. 6A and 6B are schematic views depicting the formation of a part using still another example of the 3D printing methods disclosed herein;

DETAILED DESCRIPTION

Figure 1:
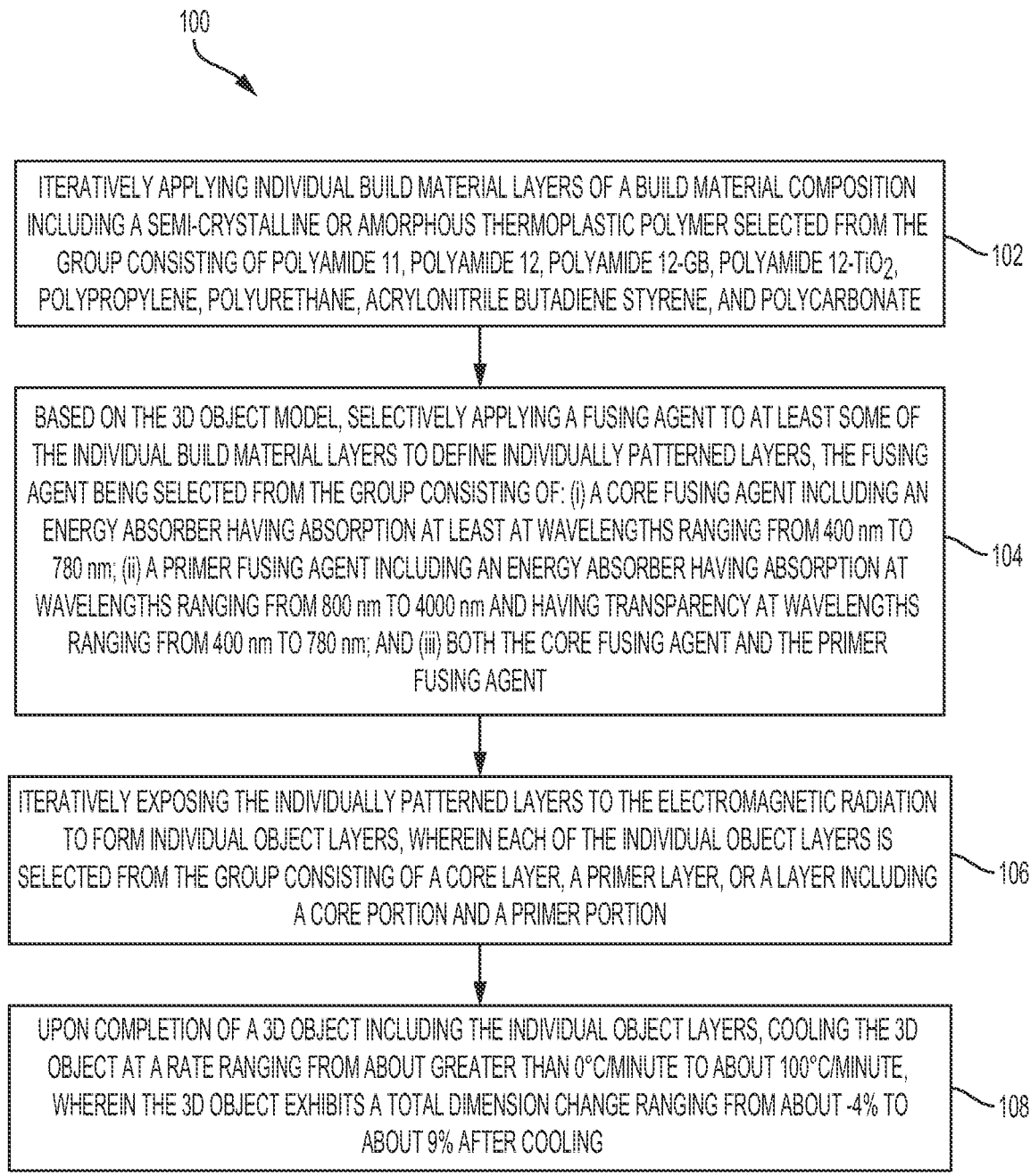
FIG. 1 is a flow diagram illustrating an example of a method for 3D printing.

Some examples of three-dimensional (3D) printing may utilize a fusing agent (including an energy absorber) to pattern polymeric build material. In these examples, an entire layer of the polymeric build material is exposed to radiation, but the patterned region (which, in some instances, is less than the entire layer) of the polymeric build material is coalesced/fused and hardened to become a layer of a 3D object. In the patterned region, the fusing agent is capable of at least partially penetrating into voids between the polymeric build material particles, and is also capable of spreading onto the exterior surface of the polymeric build material particles. This fusing agent is capable of absorbing radiation and converting the absorbed radiation to thermal energy, which in turn coalesces/fuses the polymeric build material that is in contact with the fusing agent. Coalescing/fusing causes the polymeric build material to join or blend to form a single entity (i.e., the layer of the 3D object). Coalescing/fusing may involve at least partial thermal merging, melting, binding, and/or some other mechanism that coalesces the polymeric build material to form the layer of the 3D object. The 3D object may then be exposed to a cooling process.

In these examples of 3D printing, the polymeric build material, the fusing agent, the radiation exposure process, etc., may be selected so that the patterned build material is able to coalesce/fuse to form a mechanically strong 3D object, while the non-patterned build material remains non-coalesced/non-fused when exposed to the radiation. Some polymeric build materials, which may be used in other fabrication methods (e.g., injection molding, selective laser sintering (SLS), selective laser melting (SLM), etc.), may be incompatible with the fusing agent and/or the radiation exposure process and/or with the cooling conditions of the printing process disclosed herein. For example, the fusing agent and/or the radiation exposure process, along with the cooling conditions of the printing process disclosed herein may affect the dimensional stability of the 3D object differently than other fabrication methods. Moreover, it has been found that some polymeric build materials experience a high value of shrinkage (over 10%, or in some instances over 5% in the X and/or Y directions) or expansion (over 5% in the X and/or Y directions) when exposed to the thermal cycles utilized in the 3D printing process disclosed herein. These dimensional changes can deleteriously affect the mechanical integrity of the formed object. As one example, shrunken parts may be prone to cracking. These dimensional changes can also deleteriously affect the aesthetics of the 3D object. As one example, shrunken or enlarged parts may appear warped or may have an unintended or undesirable shape.

Build Material Compositions

Disclosed herein is a build material composition that includes a semi-crystalline or amorphous thermoplastic polymer having a predicted total dimension change during 3D printing ranging from about −4 to about 9%. In some examples, the predicted total dimension change is exhibited when a cooling rate to be used during 3D printing ranges from greater than 0° C./minute to about 100° C./minute.

As used herein, the "predicted total dimension change during 3D printing" refers to the percent change in the volume of a polymer sample after being exposed to thermal cycling which simulates conditions of a 3D printing process (which uses a fusing agent and radiation exposure). A thermal cycle involves heating the polymer sample to achieve coalescence (e.g., through melting and/or glass transition) and then cooling the polymer sample to room temperature (e.g., a temperature ranging from about 18° C. to about 25° C.) at a cooling rate that simulates the cooling rate to be used in a 3D printing process. As an example, the total volume change ($\Delta V$) may be calculated by subtracting the volume ($V_2$) of the polymer sample after heating and cooling from the original volume ($V_1$) of a polymer sample, and then dividing by the original volume ($V_1$) and multiplying by 100 (i.e., $\Delta V=[(V_1-V_2)/V_1]*100$). As such, a positive value for the predicted total dimension change denotes a shrinkage of the polymer sample, and a negative value for the predicted total dimension change denotes an expansion of the polymer sample. In the examples disclosed herein, the predicted total dimension change may be determined using thermomechanical analysis, which is described further hereinbelow.

Also as used herein, when referring to a 3D printed object or part, the "total dimension change" refers to the percent change in a measureable extent in the X direction and/or Y direction (e.g., length and/or width) between a standardized plot for a 3D printed object or part and the actual 3D printed object or part (i.e., the object or part formed using the 3D printing process, which uses a fusing agent and radiation exposure). The total dimension change ($\Delta$) of a 3D printed object or part may be calculated by subtracting the dimension ($D_2$) of the actual 3D printed object or part after heating and cooling from the standardized plot dimension ($D_1$) for the 3D printed object or part, and then dividing by the standardized plot dimension ($D_1$) and multiplying by 100 (i.e., $\Delta=[(D_1-D_2)/D_1]*100$). As such, a positive value for the total dimension change denotes a shrinkage of the 3D object or part, and a negative value for the total dimension change denotes an expansion of the 3D object or part.

As mentioned herein, the volume of the polymer sample before and after thermal cycling (and thus, the predicted total dimension change of the polymer sample) may be determined using thermomechanical analysis (TMA). In these examples, the thermomechanical analysis may also include heating the polymer sample above its melting temperature and/or glass transition temperature and cooling the polymer sample to room temperature at a desired cooling rate.

In an example of thermomechanical analysis, the polymer sample at room temperature may be placed in an aluminum cylindrical vessel and lightly tapped (e.g., with a force ranging from 0.001 N to 1 N) to settle the polymer sample. Then, the height or depth of the cylindrical vessel that the polymer sample fills may be measured and used to calculate the original volume of the polymer sample. The volume (V) of the sample is equal to the height or depth (h) of the sample multiplied by the square of the radius (r) of the cylinder and pi ($\pi$) (i.e., $V=h\ r^2\pi$). Then, the polymer sample may be heated (e.g., at a heating rate of 10° C./minute) until the polymer sample melts and/or undergoes glass transition. After being heated, the polymer sample is cooled (e.g., at a cooling rate ranging from greater than 0° C./minute to about 100° C./minute or at a cooling rate ranging from greater than 0° C./minute to about 40° C./minute) until the polymer sample reaches room temperature. Then, the height or depth of the cylindrical vessel that the polymer sample fills may be measured and used to calculate the volume of the polymer sample after the thermal cycle.

The heating rate and the cooling rate to which the polymer sample is exposed during the thermomechanical analysis may be similar to the heating rate and the cooling rate to which a polymeric build material may be exposed during a 3D printing process that utilizes a fusing agent and radiation exposure. It has been found that the conditions associated with the thermal cycle of the thermomechanical analysis may facilitate a volume change that corresponds with a length and/or width change (in the X direction and/or Y direction) that the polymeric build material is likely to exhibit as a result of the 3D printing process disclosed herein. As such, in examples of the method disclosed herein, thermomechanical analysis may be used to screen semi-crystalline or amorphous thermoplastic polymers to identify predicted shrinkage or expansion that may occur during the actual 3D printing process. This screening process enables materials with minimal shrinkage or expansion (from about −4% to about 9%) to be pre-selected for use in the actual 3D printing process.

In some examples, the thermomechanical analysis may utilize: a linear variable differential transducer (LVDT) (e.g., with a 15 nm sensitivity) for accurate and precise measurements of the height or depth of the sample; a quartz probe (e.g., with a 0.001 N to 1 N force range) for sample loading; and/or a furnace and chamber for providing a purged atmosphere over a wide temperature range. In an example, the system may be plumbed with helium, which provides an inert atmosphere with high thermal conductivity. While some parameters and conditions of the system used for thermomechanical analysis have been described, it is to be understood that other parameters and/or conditions may be used.

It has been found that the semi-crystalline or amorphous thermoplastic polymers disclosed herein exhibit a minimal predicted dimension change during 3D printing as it is defined herein, and thus are compatible with the fusing agent and/or the radiation exposure process disclosed herein. Therefore, these semi-crystalline or amorphous thermoplastic polymer build materials may be successfully used in commercially available 3D printers (i.e., those that utilize fusing agent(s) and radiation exposure) to generate mechanically strong 3D objects, without having to make adjustments to the cooling settings of the printer and/or the printing agents of the printer. The energy exposure settings of the printer may or may not be adjusted, depending, in part on the type of build material that had previously been used in the printer. Because the 3D objects that are formed also exhibit minimal shrinkage or expansion (minimal total dimension change as it is defined herein), the objects have desired part shapes/geometry (which are substantially the same as the 3D object model) and mechanical integrity.

In some examples, the build material composition consists of the semi-crystalline or amorphous thermoplastic polymer with no other components. In other examples, the build material composition may include additional components, such as a filler, an antioxidant, a whitener, an antistatic agent, a flow aid, or a combination thereof.

The semi-crystalline or amorphous thermoplastic polymer may be any semi-crystalline or amorphous thermoplastic polymer that has a predicted total dimension change during 3D printing ranging from about −4% to about 9%.

In some examples, the semi-crystalline or amorphous thermoplastic polymer is a semi-crystalline thermoplastic polymer. In some of these examples, the semi-crystalline thermoplastic polymer is selected from the group consisting of a polyamide, a polyolefin, a polyurethane, and a combination thereof. In others of these examples, the semi-crystalline thermoplastic polymer is selected from the group consisting of polyamide 11 (PA 11/nylon 11), polyamide 12

(PA 12/nylon 12), polyamide 12-GB (PA 12-GB/nylon 12-GB), polyamide 12-TiO$_2$ (PA 12-TiO$_2$/nylon 12-TiO$_2$), polypropylene, polyurethane, and a combination thereof. It is to be understood that polyamide 12-GB refers to a polyamide 12 including glass beads or another form of glass disclosed herein (mixed therewith or encapsulated therein, e.g., at a weight ratio of the glass to the polyamide 12 within the ranges set forth herein). It is also to be understood that polyamide 12-TiO$_2$ refers to a polyamides 12 including titanium dioxide as a whitener and/or filler (mixed therewith at a wt % within the ranges set forth herein).

In other examples, the semi-crystalline or amorphous thermoplastic polymer is an amorphous thermoplastic polymer. In some of these examples, the amorphous thermoplastic polymer is selected from the group consisting of an acrylonitrile butadiene styrene, a polycarbonate, and a combination thereof.

As mentioned above, the semi-crystalline or amorphous thermoplastic polymer has a predicted total dimension change during 3D printing ranging from about −4% to about 9%. In some examples of the build material composition, the predicted total dimension change ranges from about 2% to about 9%, from greater than 0% to about 5%, or from about 2% to about 5%. This equates to shrinkage. In some other examples of the build material composition, the predicted total dimension change ranges from about −4% to less than 0%. This equates to expansion (i.e., negative shrinkage).

In an example, the semi-crystalline or amorphous thermoplastic polymer is a polyamide 11 and the predicted total dimension change ranges from about 5% to about 9%. In another example, the semi-crystalline or amorphous thermoplastic polymer is a polyamide 12 and the predicted total dimension change ranges from about 4% to about 6%. In still another example, the semi-crystalline or amorphous thermoplastic polymer is a polyamide 12-TiO$_2$ and the predicted total dimension change ranges from about 4% to about 6%. In yet another example, the semi-crystalline or amorphous thermoplastic polymer is a polyamide 12-GB and the predicted total dimension change ranges from about 3% to about 5%. In still another example, the semi-crystalline or amorphous thermoplastic polymer is a polypropylene and the predicted total dimension change ranges from about −4% to about 7%. In yet another example, the semi-crystalline or amorphous thermoplastic polymer is a polypropylene and the predicted total dimension change ranges from about −4% to less than 0%. In yet another example, the semi-crystalline or amorphous thermoplastic polymer is a polypropylene and the predicted total dimension change ranges from about 2% to about 7%.

As also mentioned above, the predicted total dimension change may be exhibited when the cooling rate to be used during 3D printing ranges from greater than 0° C./minute to about 100° C./minute. The cooling rate "to be used during 3D printing" refers to the cooling rate actually used in the thermomechanical analysis. The TMA cooling rate may be selected based on a cooling rate that is or will be used during an actual 3D printing process. It is to be understood that the cooling rate that is or will be used during an actual 3D printing process refers to the cooling rate of the object after the last layer of the object is printed (i.e., patterned and exposed to radiation). In other words, it is the cooling rate of the printed object. In some examples, the predicted total dimension change may be exhibited when the cooling rate to be used during 3D printing ranges from greater than 0° C./minute to about 40° C./minute. In other examples, cooling rate to be used during 3D printing may range from about 0.01° C./minute to about 1° C./minute. It is believed that control of these cooling rates (when used in an actual 3D printing process) may contribute to the minimal total dimensional change of the 3D printed object or part and thus may minimize or prevent dimensional inaccuracy.

In some examples, the semi-crystalline or amorphous thermoplastic polymer may be in the form of a powder. In other examples, the semi-crystalline or amorphous thermoplastic polymer may be in the form of a powder-like material, which includes, for example, short fibers having a length that is greater than its width. In some examples, the powder or powder-like material may be formed from, or may include, short fibers that may, for example, have been cut into short lengths from long strands or threads of material.

The semi-crystalline or amorphous thermoplastic polymer may be made up of similarly sized particles and/or differently sized particles. In an example, the average particle size of the semi-crystalline or amorphous thermoplastic polymer ranges from about 2 μm to about 200 μm. In another example, the average particle size of the semi-crystalline or amorphous thermoplastic polymer ranges from about 10 μm to about 110 μm. The term "average particle size", as used herein, may refer to a number-weighted mean diameter or a volume-weighted mean diameter of a particle distribution.

When the thermoplastic polymer of the build material composition is a semi-crystalline thermoplastic polymer, the semi-crystalline thermoplastic polymer may have a wide processing window of greater than 5° C., which can be defined by the temperature range between the melting point and the re-crystallization temperature. In some examples, the semi-crystalline thermoplastic polymer may have a melting point ranging from about 225° C. to about 250° C., from about 155° C. to about 215° C., about 160° C. to about 200° C., from about 170° C. to about 190° C., or from about 182° C. to about 189° C. In some other examples, the semi-crystalline thermoplastic polymer may have a melting range within the range of from about 130° C. to about 250° C. In an example (e.g., when the semi-crystalline thermoplastic polymer is a polyamide), the semi-crystalline thermoplastic polymer may have a melting point ranging from about 180° C. to about 190° C. In another example (e.g., when the semi-crystalline thermoplastic polymer is a polypropylene), the semi-crystalline thermoplastic polymer may have a melting point of about 160° C. In still another example (e.g., when the semi-crystalline thermoplastic polymer is a polyurethane), the semi-crystalline thermoplastic polymer may have a melting range of from about 130° C. to about 180° C. or a melting range of from about 175° C. to about 210° C.

When the thermoplastic polymer of the build material composition is an amorphous thermoplastic polymer, the amorphous thermoplastic polymer may have a softening point (or glass transition temperature) ranging from about 80° C. to about 175° C. In an example (e.g., when the amorphous thermoplastic polymer is an acrylonitrile butadiene styrene), the amorphous thermoplastic polymer may have a softening point/glass transition temperature of about 105° C. In another example (e.g., when the amorphous thermoplastic polymer is a polycarbonate), the amorphous thermoplastic polymer may have a softening point/glass transition temperature of about 150° C.

In some examples, the semi-crystalline or amorphous thermoplastic polymer does not substantially absorb radiation having a wavelength within the range of 400 nm to 1400 nm. In other examples, the semi-crystalline or amorphous thermoplastic polymer does not substantially absorb radiation having a wavelength within the range of 800 nm to 1400 nm. In still other examples, the semi-crystalline or amorphous thermoplastic polymer does not substantially absorb radiation having a wavelength within the range of 400 nm to 1200 nm. In these examples, the semi-crystalline or amorphous thermoplastic polymer may be considered to reflect the wavelengths at which the semi-crystalline or amorphous thermoplastic polymer does not substantially absorb radiation. The phrase "does not substantially absorb" means that the absorptivity of the semi-crystalline or amorphous thermoplastic polymer at a particular wavelength is 25% or less (e.g., 20%, 10%, 5%, etc.).

In some examples, the semi-crystalline or amorphous thermoplastic polymer may also include glass therein (e.g., when the semi-crystalline or amorphous thermoplastic polymer is a polyamide 12-GB). In some of these examples, the glass may be dry blended with the semi-crystalline or amorphous thermoplastic polymer. In others of these examples, the glass may be encapsulated by the semi-crystalline or amorphous thermoplastic polymer. When the glass is encapsulated by the semi-crystalline or amorphous thermoplastic polymer, the semi-crystalline or amorphous thermoplastic polymer may form a continuous coating (i.e., none of the glass is exposed) or a substantially continuous coating (i.e., 5% or less of the glass is exposed) on the glass.

Whether the glass is dry blended with the semi-crystalline or amorphous thermoplastic polymer or encapsulated by the semi-crystalline or amorphous thermoplastic polymer may depend, in part, on (i) the characteristics of the glass, and (ii) the 3D printer with which the build material composition is to be used. As an example, when the glass includes glass fibers and/or crushed glass, the glass may be encapsulated by the semi-crystalline or amorphous thermoplastic polymer. As another example, when segregation of dry blended semi-crystalline or amorphous thermoplastic polymer and glass may occur and cause damage to the 3D printer in which the build material composition is to be used, the glass may be encapsulated by the semi-crystalline or amorphous thermoplastic polymer.

When the glass is dry blended with the semi-crystalline or amorphous thermoplastic polymer, the average particle size of the glass may range from about 5 µm to about 100 µm.

When the glass is encapsulated by the semi-crystalline or amorphous thermoplastic polymer, the average particle size of the glass (prior to being coated) may range from about 5 µm to about 100 µm or from about 30 µm to about 50 µm. The average particle size of the encapsulated material (i.e., the glass coated with the semi-crystalline or amorphous thermoplastic polymer) may depend upon the size of the glass prior to coating and the thickness of the semi-crystalline or amorphous thermoplastic polymer that is applied to the glass. In an example, the average particle size of the encapsulated build material may range from about 10 µm to about 200 µm. In another example, the average particle size of the encapsulated build material may range from about 20 µm to about 120 µm.

The weight ratio of the glass to the semi-crystalline or amorphous thermoplastic polymer (e.g., polyamide 12) may range from about 5:95 to about 60:40. In some examples, the weight ratio of the glass to the semi-crystalline or amorphous thermoplastic polymer may range from about 10:90 to about 60:40; or from about 20:80 to about 60:40; or from about 40:60 to about 60:40; or from about 5:95 to about 40:60; or from about 5:95 to about 50:50. In some instances, additives (e.g., antioxidant(s), whitener(s), charging agent(s), flow aid(s), etc.) may be included with the semi-crystalline or amorphous thermoplastic polymer and glass. In these instances, the weight of the semi-crystalline or amorphous thermoplastic polymer, for the purpose of determining the weight ratio of the glass to the semi-crystalline or amorphous thermoplastic polymer, may include the weight of the additives in addition to the weight of the polymer. In other instances, the weight of the semi-crystalline or amorphous thermoplastic polymer, for the purpose of determining the weight ratio of the glass to the semi-crystalline or amorphous thermoplastic polymer, includes the weight of the polymer alone (whether or not additives are included in the build material composition). The weight ratio of the glass to the semi-crystalline or amorphous thermoplastic polymer may depend, in part, on the desired properties of the 3D object to be formed, the glass used, the semi-crystalline or amorphous thermoplastic polymer used, and/or the additives included in the semi-crystalline or amorphous thermoplastic polymer.

In one example, the glass may be selected from the group consisting of solid glass beads, hollow glass beads, porous glass beads, glass fibers, crushed glass, and a combination thereof. In another example, the glass may be selected from the group consisting of soda lime glass ($Na_2O/CaO/SiO_2$), borosilicate glass, phosphate glass, fused quartz, and a combination thereof. In still another example, the glass may be selected from the group consisting of soda lime glass, borosilicate glass, and a combination thereof. In yet other examples, the glass may be any type of non-crystalline silicate glass.

In some examples, a surface of the glass may be modified with a functional group selected from the group consisting of an acrylate functional silane, a methacrylate functional silane, an epoxy functional silane, an ester functional silane, an amino functional silane, and a combination thereof. Examples of the glass modified with such functional groups and/or such functional groups that may be used to modify the glass are available from Potters Industries, LLC (e.g., an epoxy functional silane or an amino functional silane), Gelest, Inc. (e.g., an acrylate functional silane or a methacrylate functional silane), Sigma-Aldrich (e.g., an ester functional silane), etc. In an example, the surface of the glass is modified with an amino functional silane. In another example, the surface of the glass may be modified with an epoxy functional silane. In other examples, a surface of the glass is not modified with any functional group.

In some examples, the semi-crystalline or amorphous thermoplastic polymer may also include titanium dioxide therein (e.g., when the semi-crystalline or amorphous thermoplastic polymer is a polyamide 12-$TiO_2$). In these examples, the titanium dioxide may be used as a whitener and/or filler. In an example, the titanium dioxide may be included in the build material composition in an amount ranging from greater than 0 wt % to about 10 wt %, based on the total weight of the build material composition.

In some examples, the build material composition, in addition to the semi-crystalline or amorphous thermoplastic polymer (and in some instances the glass), may include a filler, an antioxidant, a whitener (e.g., titanium dioxide), an antistatic agent, a flow aid, or a combination thereof. While several examples of these additives are provided, it is to be understood that these additives are selected to be thermally stable (i.e., will not decompose) at the 3D printing temperatures.

Filler(s) may be added to the build material composition to modify the properties of the 3D parts to be printed. Examples of suitable fillers include alumina, silica, talc, and a combination thereof. In an example, the filler may be included in the build material composition in an amount ranging from about 1 wt % to about 60 wt %, based on the total weight of the build material composition.

Antioxidant(s) may be added to the build material composition to prevent or slow molecular weight decreases of the semi-crystalline or amorphous thermoplastic polymer and/or may prevent or slow discoloration (e.g., yellowing) of the semi-crystalline or amorphous thermoplastic polymer by preventing or slowing oxidation of the semi-crystalline or amorphous thermoplastic polymer. In some examples, the antioxidant may discolor upon reacting with oxygen, and this discoloration may contribute to the discoloration of the build material composition. The antioxidant may be selected to minimize discoloration. In some examples, the antioxidant may be a radical scavenger. In these examples, the antioxidant may include IRGANOX® 1098 (benzenepropanamide, N,N'-1,6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester). The antioxidant may be in the form of fine particles (e.g., having an average particle size of 5 μm or less) that are dry blended with the semi-crystalline or amorphous thermoplastic polymer. In an example, the antioxidant may be included in the build material composition in an amount ranging from about 0.01 wt % to about 5 wt %, based on the total weight of the build material composition. In other examples, the antioxidant may be included in the build material composition in an amount ranging from about 0.01 wt % to about 2 wt % or from about 0.2 wt % to about 1 wt %, based on the total weight of the build material composition.

Whitener(s) may be added to the build material composition to improve visibility. Examples of suitable whiteners include titanium dioxide ($TiO_2$), zinc oxide (ZnO), calcium carbonate ($CaCO_3$), zirconium dioxide ($ZrO_2$), aluminum oxide ($Al_2O_3$), silicon dioxide ($SiO_2$), boron nitride (BN), and combinations thereof. In some examples, a stilbene derivative may be used as the whitener and a brightener. In these examples, the temperature(s) of the 3D printing process may be selected so that the stilbene derivative remains stable (i.e., the 3D printing temperature does not thermally decompose the stilbene derivative). In an example, any example of the whitener may be included in the build material composition in an amount ranging from greater than 0 wt % to about 10 wt %, based on the total weight of the build material composition.

Antistatic agent(s) may be added to the build material composition to suppress tribo-charging. Examples of suitable antistatic agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available antistatic agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the antistatic agent is added in an amount ranging from greater than 0 wt % to less than 5 wt %, based upon the total weight of the build material composition.

Flow aid(s) may be added to improve the coating flowability of the build material composition. Flow aids may be particularly beneficial when the build material composition has an average particle size less than 25 μm. The flow aid improves the flowability of the build material composition by reducing the friction, the lateral drag, and the tribocharge buildup (by increasing the particle conductivity). Examples of suitable flow aids include aluminum oxide ($Al_2O_3$), tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), and polydimethylsiloxane (E900). In an example, the flow aid is added in an amount ranging from greater than 0 wt % to less than 5 wt %, based upon the total weight of the build material composition.

In some examples, the build material composition disclosed herein may be reused/recycled. After a print cycle, some of the build material composition disclosed herein remains non-coalesced/non-fused, and can be reclaimed and used again. This reclaimed build material is referred to as the recycled build material composition. The recycled build material composition may be exposed to 2, 4, 6, 8, 10, or more build cycles (i.e., heating to a temperature ranging from about 50° C. to about 205° C. and then cooling), and reclaimed after each cycle. Between cycles, the recycled build material composition may be mixed with at least some fresh or virgin (i.e., not previously used in a 3D printing process) build material composition. In some examples, the weight ratio of the recycled build material composition to the fresh build material composition may be 90:10, 80:20, 70:30, 60:40, 50:50, or 40:60. The weight ratio of the recycled build material composition to the fresh build material composition may depend, in part, on the stability of the build material composition, the discoloration of the recycled build material composition (as compared to the build material composition), the desired aesthetics for the 3D object being formed, the thermal decomposition of the recycled build material composition (as compared to the build material composition), and/or the desired mechanical properties of the 3D object being formed.

3D Printing Kits and Compositions

The build material composition described herein may be part of a 3D printing kit and/or a 3D printing composition.

In an example, the three-dimensional (3D) printing kit, comprises: a build material composition including a semi-crystalline or amorphous thermoplastic polymer having a predicted total dimension change during 3D printing ranging from about −4% to about 9%; and a fusing agent to be applied to at least a portion of the build material composition during 3D printing, the fusing agent including an energy absorber to absorb electromagnetic radiation to coalesce the semi-crystalline or amorphous thermoplastic polymer in the at least the portion wherein: the fusing agent is a core fusing agent and the energy absorber has absorption at least at wavelengths ranging from 400 nm to 780 nm; or the fusing agent is a primer fusing agent and the energy absorber has absorption at wavelengths ranging from 800 nm to 4000 nm and has transparency at wavelengths ranging from 400 nm to 780 nm.

In another example, the three-dimensional (3D) printing kit, comprises: a build material composition including a semi-crystalline or amorphous thermoplastic polymer selected from the group consisting of polyamide 11, polyamide 12, polyamide 12-GB, polyamide 12-$TiO_2$, polypropylene, polyurethane, acrylonitrile butadiene styrene, and polycarbonate, wherein the semi-crystalline or amorphous thermoplastic polymer has a predicted total dimension change during 3D printing ranging from about −4% to about 9%; and a fusing agent to be applied to at least a portion of the build material composition during 3D printing.

In some examples, the 3D printing kit consists of the build material composition and the fusing agent with no other components. In other examples, the kit includes additional components, such as another fusing agent, a coloring agent, a detailing agent, or a combination thereof. The components of the kit may be maintained separately until used together in examples of the 3D printing method disclosed herein.

Any example of the build material composition may be used in the examples of the 3D printing kit. As mentioned above, the build material composition includes at least the semi-crystalline or amorphous thermoplastic polymer, and may additionally include the glass, the filler, the antioxidant, the whitener (e.g., titanium dioxide), the antistatic agent, the flow aid, or combinations thereof.

In an example of the 3D printing kit, the predicted total dimension change is exhibited when a cooling rate to be used during 3D printing ranges from greater than 0° C./minute to about 100° C./minute. In another example of the 3D printing kit, the predicted total dimension change ranges from about 2% to about 9%. In still another example of the 3D printing kit, the predicted total dimension change ranges from about −4% to less than 0%. In yet another example of the 3D printing kit, the semi-crystalline or amorphous thermoplastic polymer is selected from the group consisting of a polyamide, a polyolefin, a polyurethane, an acrylonitrile butadiene styrene, a polycarbonate, and a combination thereof.

In yet another example of the 3D printing kit, one of: (i) the semi-crystalline or amorphous thermoplastic polymer is a polyamide 11 and the predicted total dimension change ranges from about 5% to about 9%; or (ii) the semi-crystalline or amorphous thermoplastic polymer is a polyamide 12 and the total predicted dimension change ranges from about 4% to about 6%; or (iii) the semi-crystalline or amorphous thermoplastic polymer is a polyamide 12-$TiO_2$ and the predicted total dimension change ranges from about 4% to about 6%; or (iv) the semi-crystalline or amorphous thermoplastic polymer is a polyamide 12-GB and the predicted total dimension change ranges from about 3% to about 5%; or (v) the semi-crystalline or amorphous thermoplastic polymer is a polypropylene and the predicted total dimension change ranges from about −4% to about 7%.

The fusing agent includes at least the energy absorber. Example compositions of the fusing agent (e.g., example compositions of the core fusing and example compositions of the primer fusing agent) are described below. In some examples, the fusing agent is a core fusing agent and the energy absorber has absorption at least at wavelengths ranging from 400 nm to 780 nm; or the fusing agent is a primer fusing agent and the energy absorber has absorption at wavelengths ranging from 800 nm to 4000 nm and has transparency at wavelengths ranging from 400 nm to 780 nm. In some of these examples, the fusing agent is the core fusing agent and the energy absorber is carbon black; or the fusing agent is the primer fusing agent and the energy absorber is an inorganic pigment selected from the group consisting of lanthanum hexaboride, tungsten bronzes, indium tin oxide, aluminum zinc oxide, ruthenium oxide, silver, gold, platinum, iron pyroxenes, modified iron phosphates ($A_xFe_yPO_4$), modified copper pyrophosphates ($A_xCu_yP_2O_7$), and combinations thereof.

In some examples, the fusing agent is the core fusing agent and the energy absorber has absorption at least at wavelengths ranging from 400 nm to 780 nm. In some of these examples, the fusing agent is the core fusing agent and the energy absorber further has absorption at wavelengths ranging from 800 nm to 4000 nm. In some others of these examples, the fusing agent is the core fusing agent and the 3D printing kit further comprises a primer fusing agent including an energy absorber having absorption at wavelengths ranging from 800 nm to 4000 nm and having transparency at wavelengths ranging from 400 nm to 780 nm.

In other examples, the fusing agent is the primer fusing agent and the energy absorber has absorption at wavelengths ranging from 800 nm to 4000 nm and has transparency at wavelengths ranging from 400 nm to 780 nm. In some of these examples, the fusing agent is the primer fusing agent and the 3D printing kit further comprises a core fusing agent including an energy absorber having absorption at least at wavelengths ranging from 400 nm to 780 nm.

In some examples, the 3D printing kit further comprises a coloring agent selected from the group consisting of a black agent, a cyan agent, a magenta agent, and a yellow agent. In some of these examples, the 3D printing kit may include multiple coloring agents. For example, the 3D printing kit may include a coloring agent for each desired color (e.g., black, cyan, magenta, yellow, etc.). Any of the example compositions of the coloring agent described below may be used in the examples of the 3D printing kit.

In some examples, the 3D printing kit further comprises a detailing agent including a surfactant, a co-solvent, and water. Any of the example compositions of the detailing agent described below may be used in the examples of the 3D printing kit.

In another example, the three-dimensional (3D) printing composition comprises: a build material composition including a semi-crystalline or amorphous thermoplastic polymer having a predicted total dimension change during 3D printing ranging from about −4% to about 9%; and a fusing agent to be applied to at least a portion of the build material composition during 3D printing, the fusing agent including an energy absorber to absorb electromagnetic radiation to coalesce the semi-crystalline or amorphous thermoplastic polymer in the at least the portion, wherein the energy absorber has absorption at least at some wavelengths ranging from 400 nm to 4000 nm. In an example of the 3D printing composition, the semi-crystalline or amorphous thermoplastic polymer is selected from the group consisting of polyamide 11, polyamide 12, polyamide 12-GB, polyamide 12-$TiO_2$, polypropylene, polyurethane, acrylonitrile butadiene styrene, and polycarbonate. In another example of the 3D printing composition, the predicted total dimension change is exhibited when a cooling rate to be used during 3D printing ranges from greater than 0° C./minute to about 100° C./minute. In still another example of the 3D printing composition, one of: (i) the predicted total dimension change ranges from about 2% to about 9%; or (ii) the predicted total dimension change ranges from about −4% to less than 0%. In yet another example of the 3D printing composition, one of: (i) the semi-crystalline or amorphous thermoplastic polymer is a polyamide 11 and the predicted total dimension change ranges from about 5% to about 9%; or (ii) the semi-crystalline or amorphous thermoplastic polymer is a polyamide 12 and the predicted total dimension change ranges from about 4% to about 6%; or (iii) the semi-crystalline or amorphous thermoplastic polymer is a polyamide 12-$TiO_2$ and the predicted total dimension change ranges from about 4% to about 6%; or (iv) the semi-crystalline or amorphous thermoplastic polymer is a polyamide 12-GB and the predicted total dimension change ranges from about 3% to about 5%; or (v) the semi-crystalline or amorphous thermoplastic polymer is a polypropylene and the predicted total dimension change ranges from about −4% to about 7%.

As used herein, "material set" or "kit" may, in some instances, be synonymous with "composition." Further, "material set" and "kit" are understood to be compositions comprising one or more components where the different components in the compositions are each contained in one or more containers, separately or in any combination, prior to and during printing but these components can be combined together during printing. The containers can be any type of a vessel, box, or receptacle made of any material.

Fusing Agents

In the examples of the 3D printing kit, the 3D printing composition, the 3D printing methods, and the 3D printing system disclosed herein, a fusing agent may be used.

Some examples of the fusing agent have substantial absorption (e.g., 80%) at least in the visible region (400 nm-780 nm). These examples of the fusing agent are referred to as the core fusing agent, or, in some instances, the black fusing agent. As described herein, the energy absorber in the core fusing agent may also absorb energy in the infrared region (e.g., 800 nm to 4000 nm). This absorption generates heat suitable for coalescing/fusing during 3D printing, which leads to 3D objects (or 3D objects regions) having mechanical integrity and relatively uniform mechanical properties (e.g., strength, elongation at break, etc.). This absorption, however, also results in strongly colored, e.g., black, 3D objects (or 3D objects regions). In these examples of the fusing agent, the energy absorber may be referred to as the active material.

Other examples of the fusing agent include an energy absorber having absorption at wavelengths ranging from 800 nm to 4000 nm and having transparency at wavelengths ranging from 400 nm to 780 nm. These examples of the fusing agent are referred to as the primer fusing agent, or, in some instances, the low tint fusing agent. This absorption and transparency allows the primer fusing agent to absorb enough radiation to coalesce/fuse the build material composition in contact therewith while causing the 3D objects (or 3D objects regions) to be white or slightly colored.

As used herein "absorption" means that at least 80% of radiation having wavelengths within the specified range is absorbed. Also used herein, "transparency" means that 25% or less of radiation having wavelengths within the specified range is absorbed.

Core Fusing Agents

Some examples of the core fusing agent are dispersions including an energy absorber (i.e., an active material). In some examples, the active material may be an infrared light absorbing colorant. In an example, the active material is a near-infrared light absorber. Any near-infrared colorants, e.g., those produced by Fabricolor, Eastman Kodak, or BASF, Yamamoto, may be used in the core fusing agent. As one example, the core fusing agent may be a printing liquid formulation including carbon black as the active material. Examples of this printing liquid formulation are commercially known as CM997A, 516458, C18928, C93848, C93808, or the like, all of which are available from HP Inc.

As another example, the core fusing agent may be a printing liquid formulation including near-infrared absorbing dyes as the active material. Examples of this printing liquid formulation are described in U.S. Pat. No. 9,133,344, incorporated herein by reference in its entirety. Some examples of the near-infrared absorbing dye are water-soluble near-infrared absorbing dyes selected from the group consisting of:

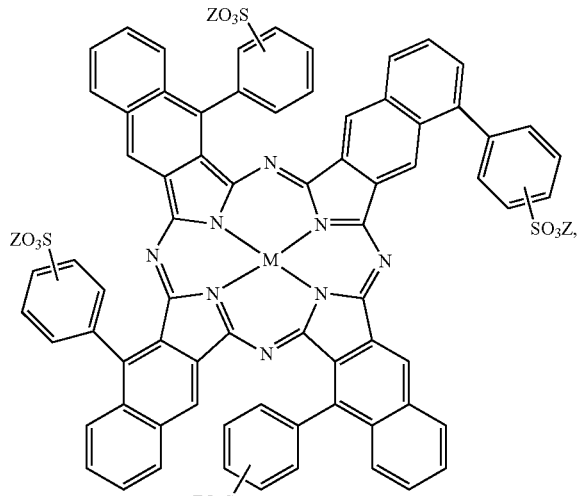

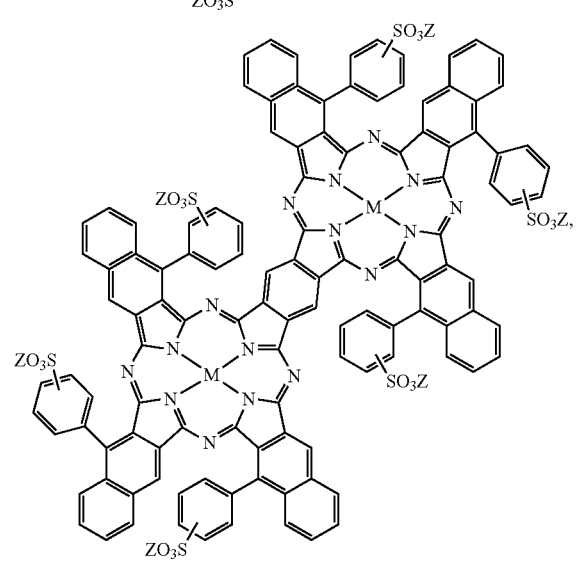

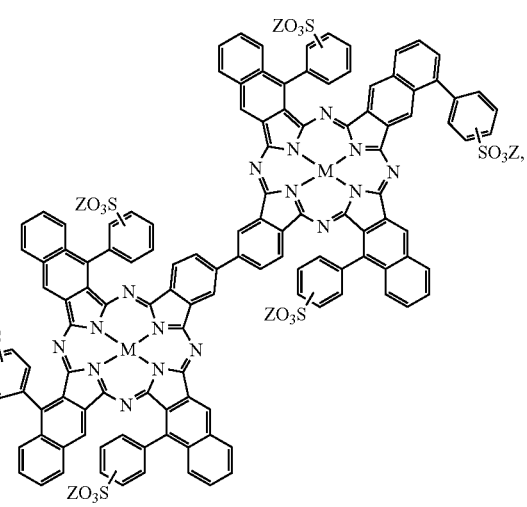

-continued

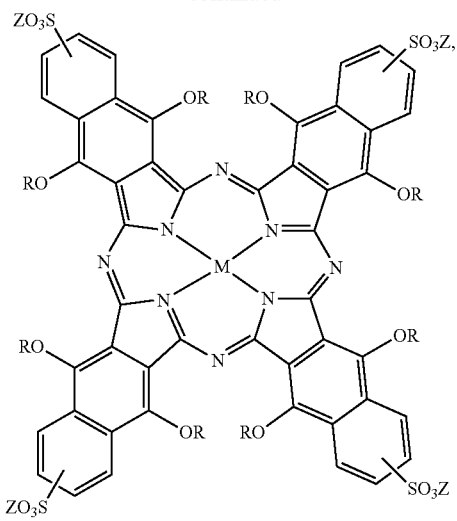

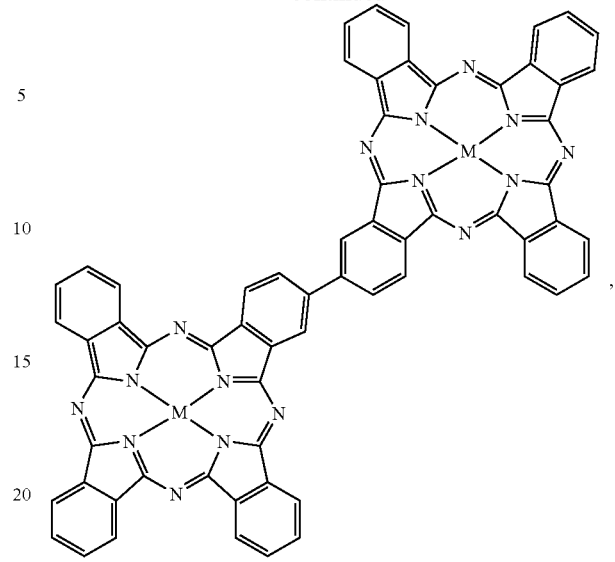

and mixtures thereof. In the above formulations, M can be a divalent metal atom (e.g., copper, etc.) or can have $OSO_3Na$ axial groups filling any unfilled valencies if the metal is more than divalent (e.g., indium, etc.), R can be hydrogen or any $C_1$-$C_8$ alkyl group (including substituted alkyl and unsubstituted alkyl), and Z can be a counterion such that the overall charge of the near-infrared absorbing dye is neutral. For example, the counterion can be sodium, lithium, potassium, $NH_4^+$, etc.

Some other examples of the near-infrared absorbing dye are hydrophobic near-infrared absorbing dyes selected from the group consisting of:

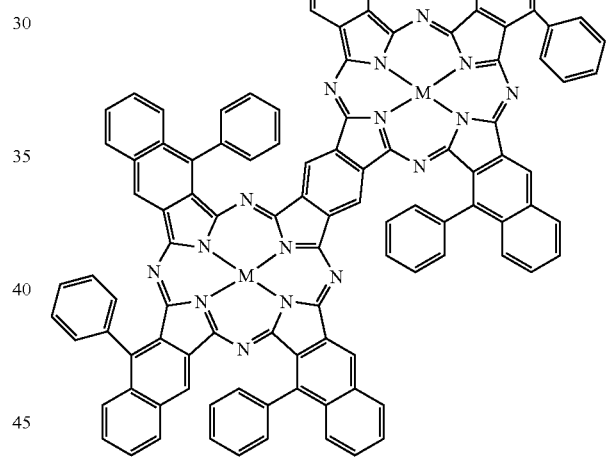

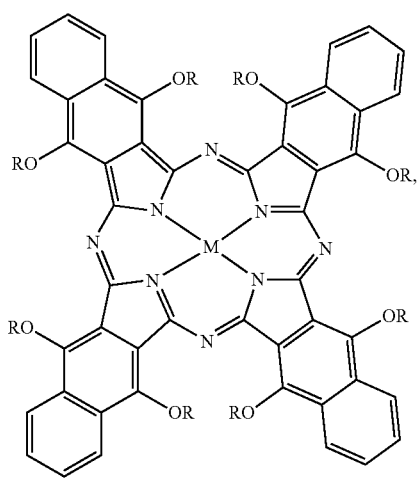

and mixtures thereof. For the hydrophobic near-infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valencies if the metal is more than divalent, and R can be hydrogen or any $C_1$-$C_8$ alkyl group (including substituted alkyl and unsubstituted alkyl).

Other near-infrared absorbing dyes or pigments may be used. Some examples include anthroquinone dyes or pigments, metal dithiolene dyes or pigments, cyanine dyes or pigments, perylenediimide dyes or pigments, croconium dyes or pigments, pyrilium or thiopyrilium dyes or pigments, boron-dipyrromethene dyes or pigments, or aza-boron-dipyrromethene dyes or pigments.

Anthroquinone dyes or pigments and metal (e.g., nickel) dithiolene dyes or pigments may have the following structures, respectively:

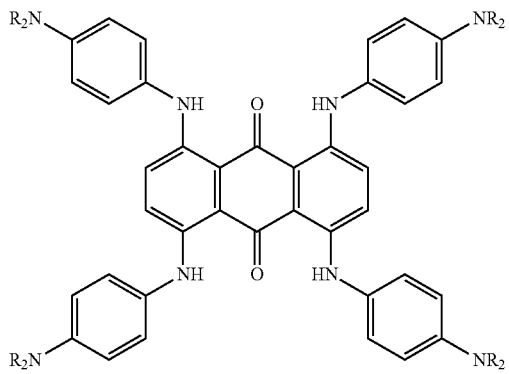

Anthroquinone dyes/pigments

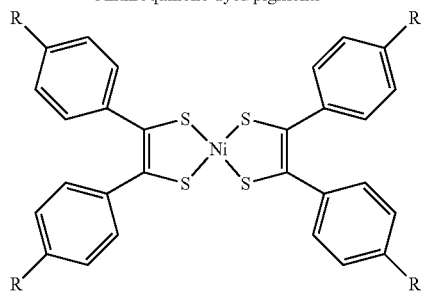

Nickel Dithiolene dyes/pigments where R in the anthroquinone dyes or pigments may be hydrogen or any $C_1$-$C_8$ alkyl group (including substituted alkyl and unsubstituted alkyl), and R in the dithiolene may be hydrogen, COOH, $SO_3$, $NH_2$, any $C_1$-$C_8$ alkyl group (including substituted alkyl and unsubstituted alkyl), or the like.

Cyanine dyes or pigments and perylenediimide dyes or pigments may have the following structures, respectively:

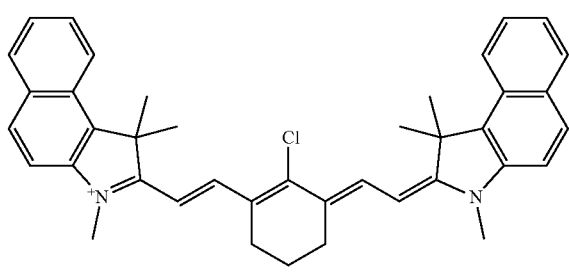

Cyanine dyes/pigments

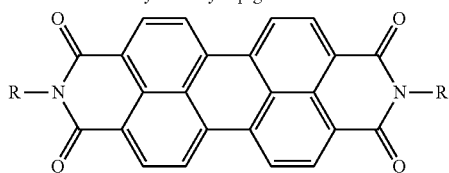

Perylenediimide dyes/pigments where R in the perylenediimide dyes or pigments may be hydrogen or any $C_1$-$C_8$ alkyl group (including substituted alkyl and unsubstituted alkyl).

Croconium dyes or pigments and pyrilium or thiopyrilium dyes or pigments may have the following structures, respectively:

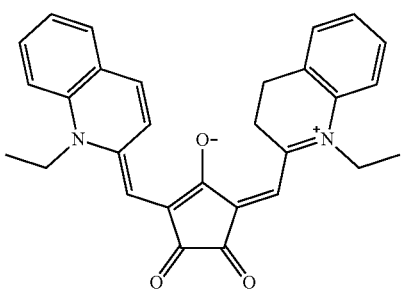

Croconium dyes/pigments

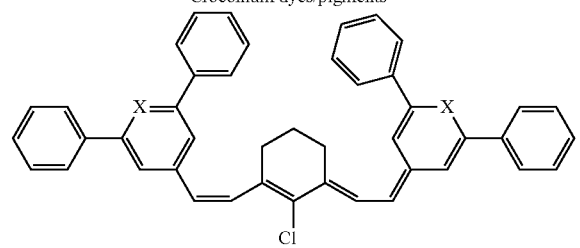

Pyrilium (X = O), thiopyrilium (X = S) dyes/pigments

Boron-dipyrromethene dyes or pigments and aza-boron-dipyrromethene dyes or pigments may have the following structures, respectively:

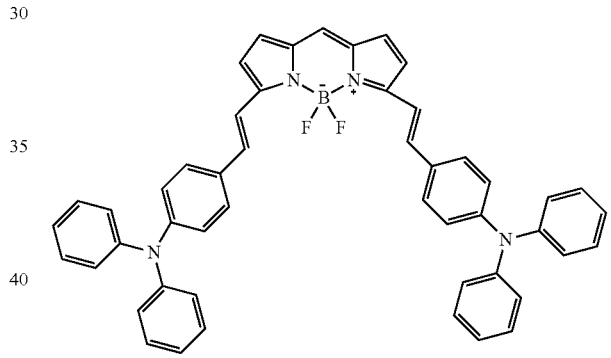

boron-dipyrromethene dyes/pigments

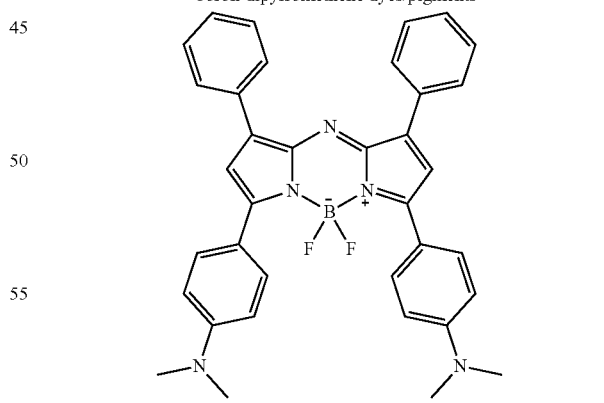

aza-boron-dipyrromethene dyes/pigments

The amount of the active material that is present in the core fusing agent ranges from greater than 0 wt % to about 40 wt % based on the total weight of the core fusing agent. In other examples, the amount of the active material in the core fusing agent ranges from about 0.3 wt % to 30 wt %, from about 1 wt % to about 20 wt %, from about 1.0 wt % up to about 10.0 wt %, or from greater than 4.0 wt % up to about 15.0 wt %. It is believed that these active material loadings provide a balance between the core fusing agent having jetting reliability and heat and/or radiation absorbance efficiency.

Primer Fusing Agents

Some examples of the primer fusing agent are dispersions including the energy absorber that has absorption at wavelengths ranging from 800 nm to 4000 nm and transparency at wavelengths ranging from 400 nm to 780 nm. The absorption of this energy absorber is the result of plasmonic resonance effects. Electrons associated with the atoms of the energy absorber may be collectively excited by radiation, which results in collective oscillation of the electrons. The wavelengths that can excite and oscillate these electrons collectively are dependent on the number of electrons present in the energy absorber particles, which in turn is dependent on the size of the energy absorber particles. The amount of energy that can collectively oscillate the particle's electrons is low enough that very small particles (e.g., 1-100 nm) may absorb radiation with wavelengths several times (e.g., from 8 to 800 or more times) the size of the particles. The use of these particles allows the primer fusing agent to be inkjet jettable as well as electromagnetically selective (e.g., having absorption at wavelengths ranging from 800 nm to 4000 nm and transparency at wavelengths ranging from 400 nm to 780 nm).

In an example, the energy absorber of the primer fusing agent has an average particle diameter (e.g., volume-weighted mean diameter) ranging from greater than 0 nm to less than 220 nm. In another example, the energy absorber has an average particle diameter ranging from greater than 0 nm to 120 nm. In a still another example, the energy absorber has an average particle diameter ranging from about 10 nm to about 200 nm.

In an example, the energy absorber of the primer fusing agent is an inorganic pigment. Examples of suitable inorganic pigments include lanthanum hexaboride ($LaB_6$), tungsten bronzes ($A_xWO_3$), indium tin oxide ($In_2O_3:SnO_2$, ITO), antimony tin oxide ($Sb_2O_3:SnO_2$, ATO), titanium nitride (TiN), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), modified copper phosphates ($A_xCu_yPO_z$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO$) may include copper iron phosphate ($\Delta$=Cu, x=0.1-0.5, and y=0.5-0.9), magnesium iron phosphate A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

The amount of the energy absorber that is present in the primer fusing agent ranges from greater than 0 wt % to about 40 wt % based on the total weight of the primer fusing agent. In other examples, the amount of the energy absorber in the primer fusing agent ranges from about 0.3 wt % to 30 wt %, from about 1 wt % to about 20 wt %, from about 1.0 wt % up to about 10.0 wt %, or from greater than 4.0 wt % up to about 15.0 wt %. It is believed that these energy absorber loadings provide a balance between the primer fusing agent having jetting reliability and heat and/or radiation absorbance efficiency.

The energy absorber of the primer fusing agent may, in some instances, be dispersed with a dispersant. As such, the dispersant helps to uniformly distribute the energy absorber throughout the primer fusing agent. Examples of suitable dispersants include polymer or small molecule dispersants, charged groups attached to the energy absorber surface, or other suitable dispersants. Some specific examples of suitable dispersants include a water-soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the primer fusing agent may range from about 10 wt % to about 200 wt % based on the weight of the energy absorber in the primer fusing agent.

A silane coupling agent may also be added to the primer fusing agent to help bond the organic and inorganic materials. Examples of suitable silane coupling agents include the SILQUEST® A series manufactured by Momentive.

Whether a single silane coupling agent is used or a combination of silane coupling agents is used, the total amount of silane coupling agent(s) in the primer fusing agent may range from about 0.1 wt % to about 50 wt % based on the weight of the energy absorber in the primer fusing agent. In an example, the total amount of silane coupling agent(s) in the primer fusing agent ranges from about 1 wt % to about 30 wt % based on the weight of the energy absorber. In another example, the total amount of silane coupling agent(s) in the primer fusing agent ranges from about 2.5 wt % to about 25 wt % based on the weight of the energy absorber.

One example of the primer fusing agent includes cesium tungsten oxide (CTO) nanoparticles as the energy absorber. The CTO nanoparticles have a formula of $Cs_xWO_3$, where $0<x<1$. The cesium tungsten oxide nanoparticles may give the primer fusing agent a light blue color. The strength of the color may depend, at least in part, on the amount of the CTO nanoparticles in the primer fusing agent. When it is desirable to form an outer white layer on the 3D object, less of the CTO nanoparticles may be used in the primer fusing agent in order to achieve the white color. In an example, the CTO nanoparticles may be present in the primer fusing agent in an amount ranging from about 1 wt % to about 20 wt % (based on the total weight of the primer fusing agent).

The average particle size (e.g., volume-weighted mean diameter) of the CTO nanoparticles may range from about 1 nm to about 40 nm. In some examples, the average particle size of the CTO nanoparticles may range from about 1 nm to about 15 nm or from about 1 nm to about 10 nm. The upper end of the particle size range (e.g., from about 30 nm to about 40 nm) may be less desirable, as these particles may be more difficult to stabilize.

This example of the primer fusing agent may also include a zwitterionic stabilizer. The zwitterionic stabilizer may improve the stabilization of this example of the primer fusing agent. While the zwitterionic stabilizer has an overall neutral charge, at least one area of the molecule has a positive charge (e.g., amino groups) and at least one other area of the molecule has a negative charge. The CTO nanoparticles may have a slight negative charge. The zwitterionic stabilizer molecules may orient around the slightly negative CTO nanoparticles with the positive area of the zwitterionic stabilizer molecules closest to the CTO nanoparticles and the negative area of the zwitterionic stabilizer molecules furthest away from the CTO nanoparticles. Then, the negative charge of the negative area of the zwitterionic stabilizer molecules may repel CTO nanoparticles from each other. The zwitterionic stabilizer molecules may form a protective layer around the CTO nanoparticles, and prevent them from coming into direct contact with each other and/or increase the distance between the particle surfaces (e.g., by a distance ranging from about 1 nm to about 2 nm). Thus, the zwitterionic stabilizer may prevent the CTO nanoparticles from agglomerating and/or settling in the primer fusing agent.

Examples of suitable zwitterionic stabilizers include $C_2$ to $C_8$ betaines, $C_2$ to $C_8$ aminocarboxylic acids having a solubility of at least 10 g in 100 g of water, taurine, and combinations thereof. Examples of the $C_2$ to $C_8$ aminocarboxylic acids include beta-alanine, gamma-aminobutyric acid, glycine, and combinations thereof.

The zwitterionic stabilizer may be present in the primer fusing agent in an amount ranging from about 2 wt % to about 35 wt % (based on the total weight of the primer fusing agent). When the zwitterionic stabilizer is the $C_2$ to $C_8$ betaine, the $C_2$ to $C_8$ betaine may be present in an amount ranging from about 8 wt % to about 35 wt % of the total weight of the primer fusing agent. When the zwitterionic stabilizer is the $C_2$ to $C_8$ aminocarboxylic acid, the $C_2$ to $C_8$ aminocarboxylic acid may be present in an amount ranging from about 2 wt % to about 20 wt % of the total weight of the primer fusing agent. When the zwitterionic stabilizer is taurine, taurine may be present in an amount ranging from about 2 wt % to about 35 wt % of the total weight of the primer fusing agent.

In this example, the weight ratio of the CTO nanoparticles to the zwitterionic stabilizer may range from 1:10 to 10:1; or the weight ratio of the CTO nanoparticles to the zwitterionic stabilizer may be 1:1.

Fusing Agent Vehicles

As used herein, "FA vehicle" may refer to the liquid in which the energy absorber is dispersed or dissolved to form the fusing agent (e.g., the core fusing agent or the primer fusing agent). A wide variety of FA vehicles, including aqueous and non-aqueous vehicles, may be used in the fusing agent. In some examples, the FA vehicle may include water alone or a non-aqueous solvent alone with no other components. In other examples, the FA vehicle may include other components, depending, in part, upon the applicator that is to be used to dispense the fusing agent. Examples of other suitable fusing agent components include co-solvent(s), humectant(s), surfactant(s), antimicrobial agent(s), anti-kogation agent(s), and/or chelating agent(s).

The solvent of the fusing agent may be water or a non-aqueous solvent (e.g., ethanol, acetone, n-methyl pyrrolidone, aliphatic hydrocarbons, etc.). In some examples, the fusing agent consists of the energy absorber and the solvent (without other components). In these examples, the solvent makes up the balance of the fusing agent.

Classes of organic co-solvents that may be used in a water-based fusing agent include aliphatic alcohols, aromatic alcohols, diols, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, both substituted and unsubstituted formamides, both substituted and unsubstituted acetamides, and the like. Other examples of organic co-solvents include dimethyl sulfoxide (DMSO), isopropyl alcohol, ethanol, pentanol, acetone, or the like.

Other examples of suitable co-solvents include water-soluble high-boiling point solvents, which have a boiling point of at least 120° C., or higher. Some examples of high-boiling point solvents include 2-pyrrolidone (i.e., 2-pyrrolidinone, boiling point of about 245° C.), 1-methyl-2-pyrrolidone (boiling point of about 203° C.), N-(2-hydroxyethyl)-2-pyrrolidone (boiling point of about 140° C.), 2-methyl-1,3-propanediol (boiling point of about 212° C.), and combinations thereof.

The co-solvent(s) may be present in the fusing agent in a total amount ranging from about 1 wt % to about 50 wt % based upon the total weight of the fusing agent, depending upon the jetting architecture of the applicator. In an example, the total amount of the co-solvent(s) present in the fusing agent is 25 wt % based on the total weight of the fusing agent.

The co-solvent(s) of the fusing agent may depend, in part, upon the jetting technology that is to be used to dispense the fusing agent. For example, if thermal inkjet printheads are to be used, water and/or ethanol and/or other longer chain alcohols (e.g., pentanol) may be the solvent (i.e., makes up 35 wt % or more of the fusing agent) or co-solvents. For another example, if piezoelectric inkjet printheads are to be used, water may make up from about 25 wt % to about 30 wt % of the fusing agent, and the solvent (i.e., 35 wt % or more of the fusing agent) may be ethanol, isopropanol, acetone, etc. The co-solvent(s) of the fusing agent may also depend, in part, upon the build material composition that is being used with the fusing agent. For a hydrophobic powder (such as the polyamides disclosed herein), the FA vehicle may include a higher solvent content in order to improve the flow of the fusing agent into the build material composition.

The FA vehicle may also include humectant(s). In an example, the total amount of the humectant(s) present in the fusing agent ranges from about 3 wt % to about 10 wt %, based on the total weight of the fusing agent. An example of a suitable humectant is ethoxylated glycerin having the following formula:

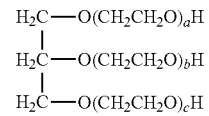

in which the total of a+b+c ranges from about 5 to about 60, or in other examples, from about 20 to about 30. An example of the ethoxylated glycerin is LIPONIC® EG-1 (LEG-1, glycereth-26, a+b+c=26, available from Lipo Chemicals).

In some examples, the FA vehicle includes surfactant(s) to improve the jettability of the fusing agent. Examples of suitable surfactants include a self-emulsifiable, non-ionic wetting agent based on acetylenic diol chemistry (e.g., SURFYNOL® SEF from Air Products and Chemicals, Inc.), a non-ionic fluorosurfactant (e.g., CAPSTONE® fluorosurfactants, such as CAPSTONE® FS-35, from Chemours), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TEGO® Wet 510 (polyether siloxane) available from Evonik Industries).

Whether a single surfactant is used or a combination of surfactants is used, the total amount of surfactant(s) in the fusing agent may range from about 0.01 wt % to about 10 wt % based on the total weight of the fusing agent. In an example, the total amount of surfactant(s) in the fusing agent may be about 3 wt % based on the total weight of the fusing agent.

An anti-kogation agent may be included in the fusing agent that is to be jetted using thermal inkjet printing. Kogation refers to the deposit of dried printing liquid (e.g., fusing agent) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3 A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the fusing agent may range from greater than 0.20 wt % to about 0.65 wt % based on the total weight of the fusing agent. In an example, the oleth-3-phosphate is included in an amount ranging from about 0.20 wt % to about 0.60 wt %, and the low molecular weight polyacrylic acid polymer is included in an amount ranging from about 0.005 wt % to about 0.03 wt %.

The FA vehicle may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® B20 (Thor Chemicals), ACTICIDE® M20 (Thor Chemicals), ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.).

In an example, the fusing agent may include a total amount of antimicrobial agents that ranges from about 0.05 wt % to about 1 wt %. In an example, the antimicrobial agent(s) is/are a biocide(s) and is/are present in the fusing agent in an amount of about 0.25 wt % (based on the total weight of the fusing agent).

Chelating agents (or sequestering agents) may be included in the FA vehicle to eliminate the deleterious effects of heavy metal impurities. Examples of chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the fusing agent may range from greater than 0 wt % to about 2 wt % based on the total weight of the fusing agent. In an example, the chelating agent(s) is/are present in the fusing agent in an amount of about 0.04 wt % (based on the total weight of the fusing agent).

Coloring Agents

In the examples of the 3D printing kit, the 3D printing composition, the 3D printing methods, and the 3D printing system disclosed herein, a coloring agent may be used. The coloring agent may include a colorant, a co-solvent, and a balance of water. In some examples, the coloring agent consists of these components, and no other components. In some other examples, the coloring agent may further include a binder (e.g., an acrylic latex binder, which may be a copolymer of any two or more of styrene, acrylic acid, methacrylic acid, methyl methacrylate, ethyl methacrylate, and butyl methacrylate) and/or a buffer. In still other examples, the coloring agent may further include additional components, such as dispersant(s), humectant(s), surfactant(s), anti-kogation agent(s), antimicrobial agent(s), and/or chelating agent(s) (each of which is described above in reference to the fusing agent).

The coloring agent may be a black agent, a cyan agent, a magenta agent, or a yellow agent. As such, the colorant may be a black colorant, a cyan colorant, a magenta colorant, a yellow colorant, or a combination of colorants that together achieve a black, cyan, magenta, or yellow color.

In some instances, the colorant of the coloring agent may be transparent to infrared wavelengths. In other instances, the colorant of the coloring agent may not be completely transparent to infrared wavelengths, but does not absorb enough radiation to sufficiently heat the build material composition in contact therewith. In an example, the colorant absorbs less than 10% of radiation having wavelengths in a range of 650 nm to 2500 nm. In another example, the colorant absorbs less than 20% of radiation having wavelengths in a range of 650 nm to 4000 nm.

The colorant of the coloring agent is also capable of absorbing radiation with wavelengths of 650 nm or less. As such, the colorant absorbs at least some wavelengths within the visible spectrum, but absorbs little or no wavelengths within the near-infrared spectrum. This is in contrast to at least some examples of the energy absorber in the fusing agent, which absorbs wavelengths within the near-infrared spectrum and/or the infrared spectrum (e.g., the fusing agent absorbs 80% or more of radiation with wavelengths within the near-infrared spectrum and/or the infrared spectrum). As such, the colorant in the coloring agent will not substantially absorb the fusing radiation, and thus will not initiate coalescing/fusing of the build material composition in contact therewith when the build material composition is exposed to the fusing radiation.

Examples of IR transparent colorants include acid yellow 23 (AY 23), AY17, acid red 52 (AR 52), AR 289, and reactive red 180 (RR 180). Examples of colorants that absorb some visible wavelengths and some IR wavelengths include cyan colorants, such as direct blue 199 (DB 199) and pigment blue 15:3 (PB 15:3).

In other examples, the colorant may be any azo dye having sodium or potassium counter ion(s) or any diazo (i.e., double azo) dye having sodium or potassium counter ion(s).

Examples of black dyes may include tetrasodium (6Z)-4-acetamido-5-oxo-6-[[7-sulfonato-4-(4-sulfonatophenyl) azo-1-naphthyl]hydrazono]naphthalene-1,7-disulfonate with a chemical structure of:

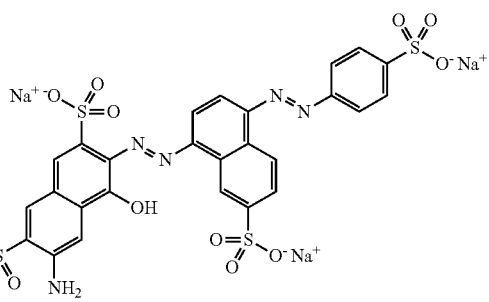

(commercially available as Food Black 2); tetrasodium (6E)-4-amino-5-oxo-3-[[4-(2-sulfonatooxyethylsulfonyl) phenyl]diazenyl]-6-[[4-(2-sulfonatooxyethylsulfonyl)phenyl]hydrazinylidene]naphthalene-2,7-disulfonate with a chemical structure of:

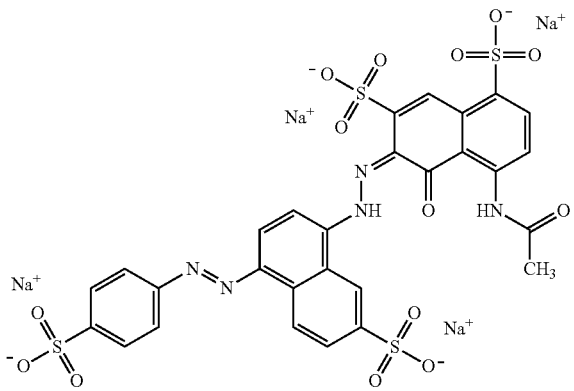 [SMILES: [Na+] ; CC(=O)Nc1ccc(S(=O)(=O)[O-])c2c1C(=O)/C(=N\Nc1ccc(/N=N/c3ccc(S(=O)(=O)[O-])cc3)c3ccc(S(=O)(=O)[O-])cc13)C(S(=O)(=O)[O-])=C2 ; [Na+] ; [Na+] ; [Na+]]

(commercially available as Food Black 1); tetrasodium 6-amino-4-hydroxy-3-[[7-sulfonato-4-[(4-sulfonatophenyl) azo]-1-naphthyl]azo]naphthalene-2,7-disulfonate with a chemical structure of:

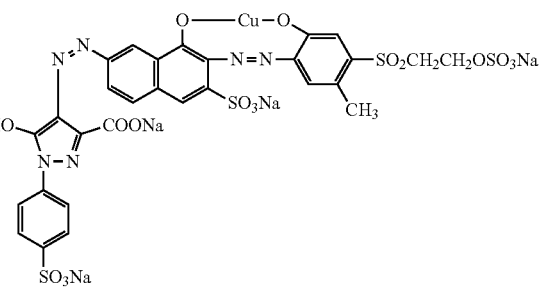

(commercially available as Reactive Black 31); tetrasodium (6E)-4-amino-5-oxo-3-[[4-(2-sulfonatooxyethylsulfonyl) phenyl]diazenyl]-6-[[4-(2-sulfonatooxyethylsulfonyl)phenyl]hydrazinylidene]naphthalene-2,7-disulfonate with a chemical structure of:

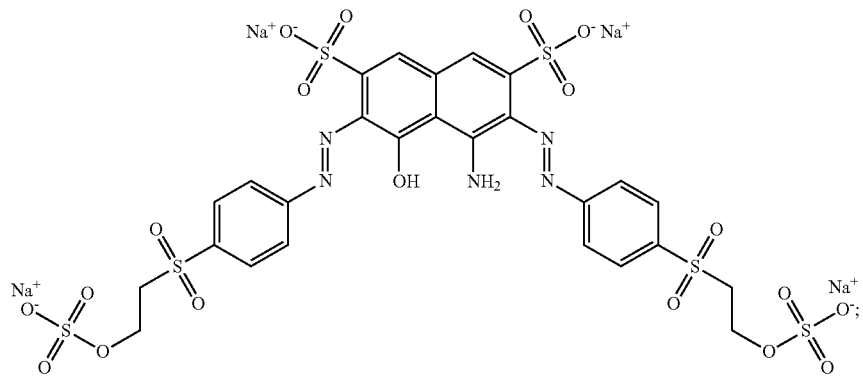

and combinations thereof. Some other commercially available examples of black dyes include multipurpose black azo-dye based liquids, such as PRO-JET® Fast Black 1 (made available by Fujifilm Holdings), and black azo-dye based liquids with enhanced water fastness, such as PRO-JET® Fast Black 2 (made available by Fujifilm Holdings).

Examples of cyan dyes include ethyl-[4-[[4-[ethyl-[(3-sulfophenyl) methyl] amino] phenyl]-(2-sulfophenyl) ethylidene]-1-cyclohexa-2,5-dienylidene]-[(3-sulfophenyl) methyl] azanium with a chemical structure of:

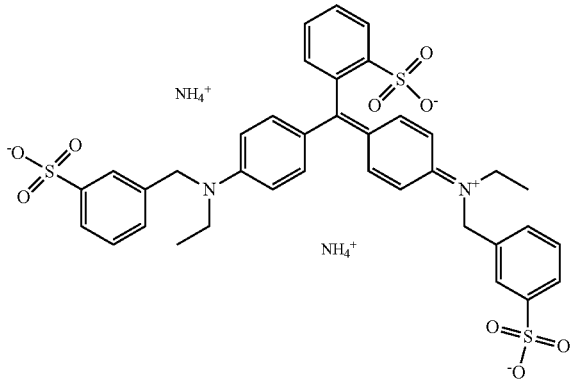

(commercially available as Acid Blue 9, where the counter ion may alternatively be sodium counter ions or potassium counter ions); sodium 4-[(E)-{4-[benzyl(ethyl)amino]phenyl}{(4E)-4-[benzyl(ethyl)iminio]cyclohexa-2,5-dien-1-ylidene}methyl]benzene-1,3-disulfonate with a chemical structure of:

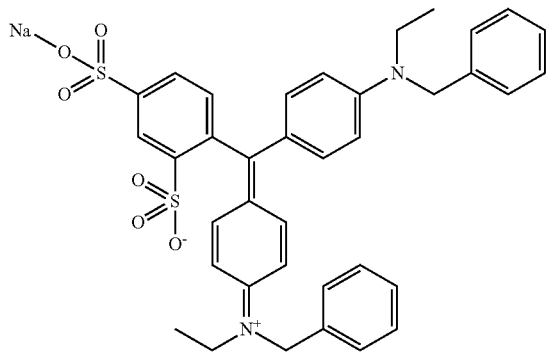

(commercially available as Acid Blue 7); and a phthalocyanine with a chemical structure of:

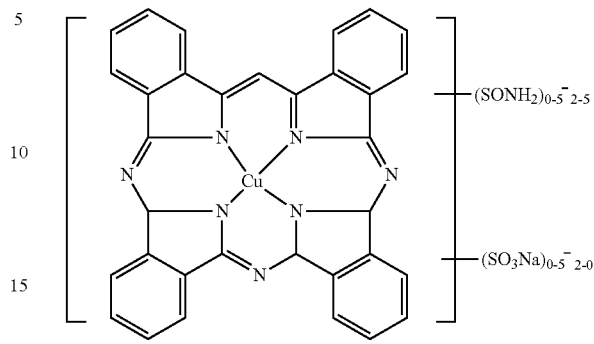

(commercially available as Direct Blue 199); and combinations thereof.

An example of the pigment based coloring agent may include from about 1 wt % to about 10 wt % of pigment(s), from about 10 wt % to about 30 wt % of co-solvent(s), from about 1 wt % to about 10 wt % of dispersant(s), from about 0.1 wt % to about 5 wt % of binder(s), from 0.01 wt % to about 1 wt % of anti-kogation agent(s), from about 0.05 wt % to about 0.1 wt % antimicrobial agent(s), and a balance of water. An example of the dye based coloring agent may include from about 1 wt % to about 7 wt % of dye(s), from about 10 wt % to about 30 wt % of co-solvent(s), from about 1 wt % to about 7 wt % of dispersant(s), from about 0.05 wt % to about 0.1 wt % antimicrobial agent(s), from 0.05 wt % to about 0.1 wt % of chelating agent(s), from about 0.005 wt % to about 0.2 wt % of buffer(s), and a balance of water.

Some examples of the coloring agent include a set of cyan, magenta, and yellow agents, such as C1893A (cyan), C1984A (magenta), and C1985A (yellow); or C4801A (cyan), C4802A (magenta), and C4803A (yellow); all of which are available from HP Inc. Other commercially available coloring agents include C9384A (printhead HP 72), C9383A (printhead HP 72), C4901A (printhead HP 940), and C4900A (printhead HP 940).

Detailing Agents

In the examples of the 3D printing kit, the 3D printing composition, the 3D printing methods, and the 3D printing system disclosed herein a detailing agent may be used. The detailing agent may include a surfactant, a co-solvent, and a balance of water. In some examples, the detailing agent consists of these components, and no other components. In some other examples, the detailing agent may further include additional components, such as humectant(s), anti-kogation agent(s), antimicrobial agent(s), and/or chelating agent(s) (each of which is described above in reference to the fusing agent).

The surfactant(s) that may be used in the detailing agent include any of the surfactants listed above in reference to the fusing agent. The total amount of surfactant(s) in the detailing agent may range from about 0.10 wt % to about 5.00 wt % with respect to the total weight of the detailing agent.

The co-solvent(s) that may be used in the detailing agent include any of the co-solvents listed above in reference to the fusing agent. The total amount of co-solvent(s) in the detailing agent may range from about 1.00 wt % to about 20.00 wt % with respect to the total weight of the detailing agent.

Similar to the fusing agent, the co-solvent(s) of the detailing agent may depend, in part upon the jetting technology that is to be used to dispense the detailing agent. For example, if thermal inkjet printheads are to be used, water and/or ethanol and/or other longer chain alcohols (e.g., pentanol) may make up 35 wt % or more of the detailing agent. For another example, if piezoelectric inkjet printheads are to be used, water may make up from about 25 wt % to about 30 wt % of the detailing agent, and 35 wt % or more of the detailing agent may be ethanol, isopropanol, acetone, etc.

The balance of the detailing agent is water. As such, the amount of water may vary depending upon the amounts of the other components that are included.

While the example detailing agent described herein does not include a colorant, it is to be understood that any of the colorants described for the coloring agent (i.e., transparent to infrared wavelengths) may be used in the detailing agent. As one example, it may be desirable to add color to the detailing agent when the detailing agent is applied to the edge of a colored part. Color in the detailing agent may be desirable when used at a part edge because some of the colorant may become embedded in the build material that fuses/coalesces at the edge.

Printing Methods and Methods of Use

Figure 2:
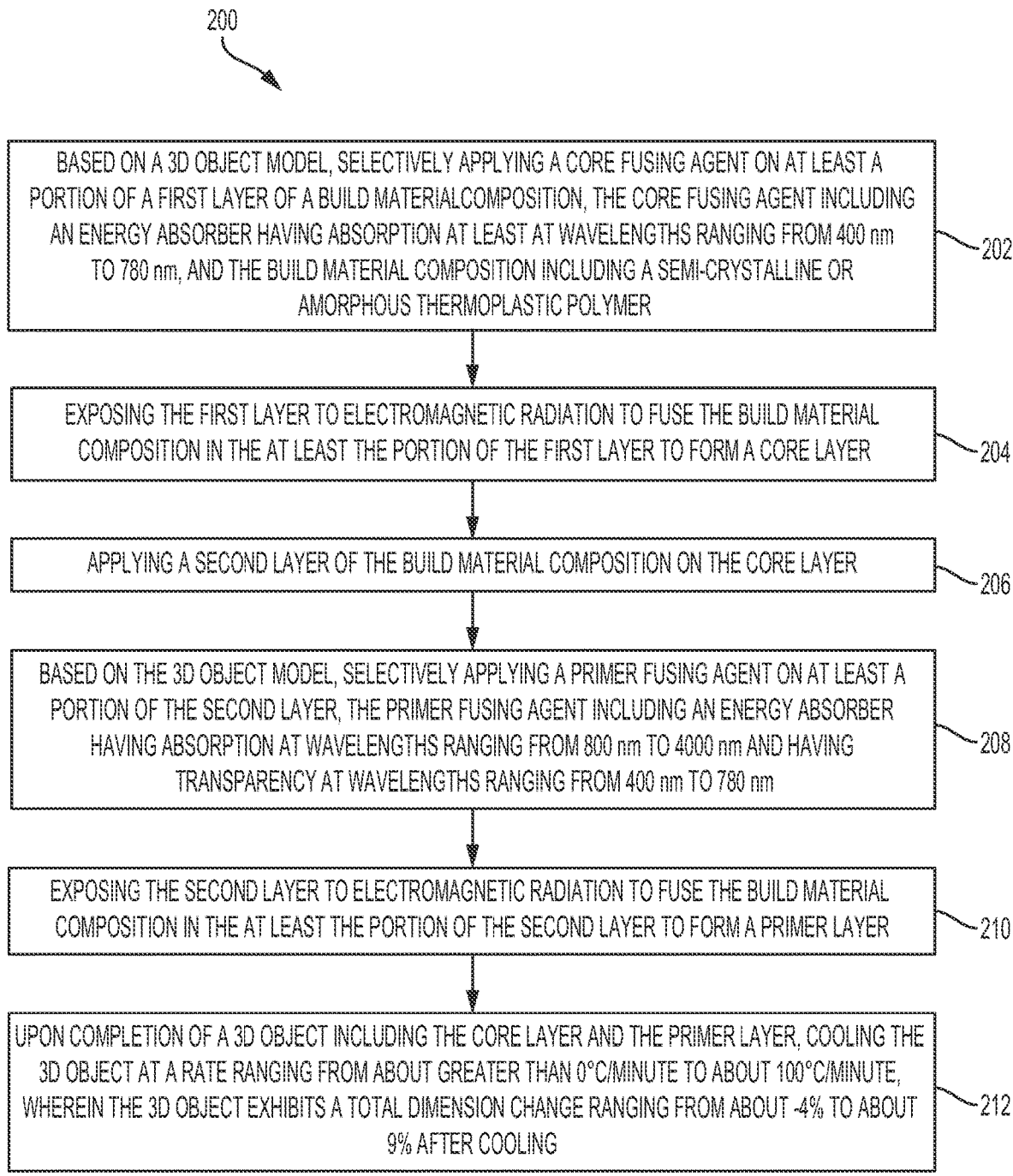
FIG. 2 is a flow diagram illustrating another example of a method for 3D printing.

Referring now to FIGS. 1 and 2, examples of a method 100 for using the 3D printing kit and a method 200 for 3D printing are depicted. The examples of the methods 100, 200 may use examples of the 3D printing kit and/or composition disclosed herein. Additionally, the examples of the methods 100, 200 may be used to print 3D objects that exhibit a white color, a cyan color, a magenta color, a yellow color, a black color, or a combination thereof.

Before either of the methods 100 or 200 is performed, the method 100 or 200 may involve exposing the build material composition to thermomechanical analysis to identify the predicted total dimension change of the build material composition. Thermomechanical analysis may be performed as described herein, and may enable polymers to be screened, in terms of shrinkage or expansion, prior to performing the entire printing method 100, 200. As described herein, the conditions used during thermomechanical analysis may emulate the conditions of 3D printing (including heating and cooling); and thus, any predicted total dimension change that the polymeric build material undergoes during thermomechanical analysis may be indicative of the total dimension change that may take place during 3D printing. If the screened polymer shows a minimal predicted total dimensional change (from about −4% to about 9%), the polymer may be used in the method 100 or 200.

As shown in FIG. 1, the method 100 for using the three-dimensional (3D) printing kit comprises: iteratively applying individual build material layers of a build material composition including a semi-crystalline or amorphous thermoplastic polymer selected from the group consisting of polyamide 11, polyamide 12, polyamide 12-GB, polyamide 12-TiO$_2$, polypropylene, polyurethane, acrylonitrile butadiene styrene, and polycarbonate (reference numeral 102); based on the 3D object model, selectively applying a fusing agent to at least some of the individual build material layers to define individually patterned layers, the fusing agent being selected from the group consisting of: (i) a core fusing agent including an energy absorber having absorption at least at wavelengths ranging from 400 nm to 780 nm; (ii) a primer fusing agent including an energy absorber having absorption at wavelengths ranging from 800 nm to 4000 nm and having transparency at wavelengths ranging from 400 nm to 780 nm; and (iii) both the core fusing agent and the primer fusing agent (reference numeral 104); iteratively exposing the individually patterned layers to the electromagnetic radiation to form individual object layers, wherein each of the individual object layers is selected from the group consisting of a core layer, a primer layer, or a layer including a core portion and a primer portion (reference numeral 106); and upon completion of a 3D object including the individual object layers, cooling the 3D object at a rate ranging from about greater than 0° C./minute to about 100° C./minute, wherein the 3D object exhibits a total dimension change ranging from about −4% to about 9% after cooling (reference numeral 108).

In some examples of the method 100, the core fusing agent is applied to form at least one inner layer of the 3D object, and wherein the primer fusing agent is applied to form at least one outer layer of the 3D object.

In some other examples of the method 100, prior to cooling, the method 100 further comprises applying a coloring agent on an outermost of the individual object layers.

As shown in FIG. 2, the method 200 for three-dimensional (3D) printing comprises: based on a 3D object model, selectively applying a core fusing agent on at least a portion of a first layer of a build material composition, the core fusing agent including an energy absorber having absorption at least at wavelengths ranging from 400 nm to 780 nm, and the build material composition including a semi-crystalline or amorphous thermoplastic polymer (reference numeral 202); exposing the first layer to electromagnetic radiation to fuse the build material composition in the at least the portion of the first layer to form a core layer (reference numeral 204); applying a second layer of the build material composition on the core layer (reference numeral 206); based on the 3D object model, selectively applying a primer fusing agent on at least a portion of the second layer, the primer fusing agent including an energy absorber having absorption at wavelengths ranging from 800 nm to 4000 nm and having transparency at wavelengths ranging from 400 nm to 780 nm (reference numeral 208); exposing the second layer to electromagnetic radiation to fuse the build material composition in the at least the portion of the second layer to form a primer layer (reference numeral 210); and upon completion of a 3D object including the core layer and the primer layer, cooling the 3D object at a rate ranging from about greater than 0° C./minute to about 100° C./minute, wherein the 3D object exhibits a total dimension change ranging from about −4% to about 9% after cooling (reference numeral 212).

Figure 3:
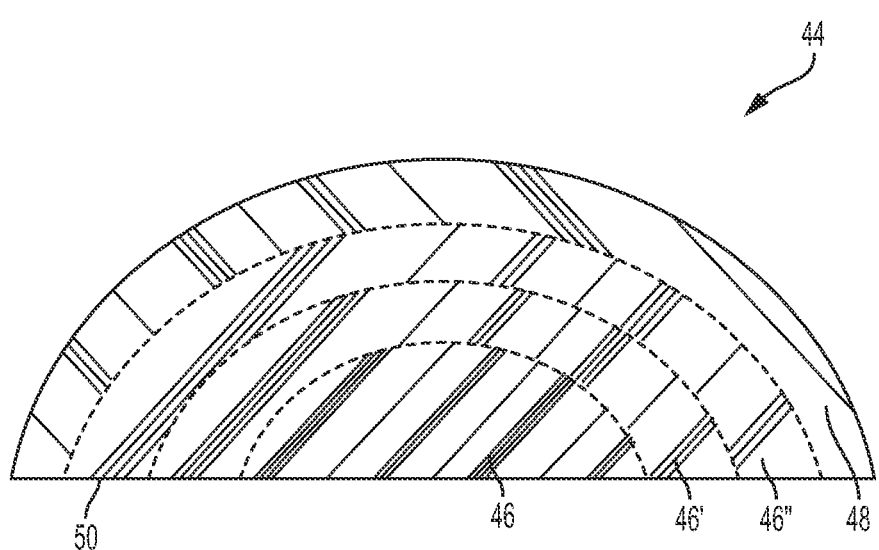
FIG. 3 is a cross-sectional view of an example of a part formed using an example of the 3D printing methods disclosed herein.

The methods 100, 200 may be used to form an object 44 as shown in FIG. 3, which includes several core layers 46, 46', 46" and an outer white layer 48 (also referred to herein as a primer layer). The core layers 46, 46', 46" are sequentially formed by selectively patterning respective build material layers with the core fusing agent 28 and exposing each patterned layer to electromagnetic radiation. The core layers 46, 46', 46" may be black or a dark color due to the absorber in the core fusing agent 28. The outer white layer 48 is formed by applying a build material layer on the outermost core layer 46", patterning it with the primer fusing agent 26, 26', and exposing it to electromagnetic radiation. Since the primer fusing agent 26, 26' has no or low tint, the white color of the build material composition 16 is visible, and thus gives the outer white layer 48 its white appearance. The outer white layer 48 provides the object 44 with a white (or slightly tinted) exterior surface. As such, the outer white layer 48 optically isolates the black core layer(s) 46, 46', 46" that it covers.

In the example object 44 shown in FIG. 3, the outer white layer 48 does not completely surround the object 44, but rather may be formed on the outer surface(s) of the core layer 46" that will be visible. For example, in FIG. 3, the surface 50 of the object 44 may not be visible when the object 44 is in use, and thus it may not be desirable to form the outer white layer 48 on this surface 50.

It is to be understood that the methods 100, 200 may include additional processing to form the object 44 with an outer colored layer (not shown in FIG. 3) on at least a portion of the outer white layer 48, or to form another object 44' (shown in FIG. 4H) which has the core layer(s) 46 completely encapsulated by a primer layer (including primer layer portions 48', 48", 48''', which are referred to herein respectively as primer layers 48, 48', 48") and an outer colored layer (including colored layer portions 52, 52', 52", which are referred to herein as colored layers 52, 52', 52").

The method 300 to form the object 44' will now be discussed in reference to FIGS. 4A through 4H. It is to be understood that the method 300 may be an example of the method 100 and/or the method 200.

Prior to execution of any of the methods 100, 200, 300 disclosed herein or as part of the methods 100, 200, 300 a controller 36 (see, e.g., FIG. 7) may access data stored in a data store 34 (see, e.g., FIG. 7) pertaining to a 3D object 44' that is to be printed. For example, the controller 36 may determine the number of layers of the build material composition 16 that are to be formed, the locations at which the fusing agent(s) 26, 26', 28 from the applicator(s) 24A, 24B is/are to be deposited on each of the respective layers, etc.

In FIGS. 4A and 4B, a layer 54 of the build material composition 16 is applied on the build area platform 12. As mentioned above, the build material composition 16 includes at least the semi-crystalline or amorphous thermoplastic polymer, and may additionally include the glass, the filler, the antioxidant, the whitener (e.g., titanium dioxide), the antistatic agent, the flow aid, or combinations thereof.

In the example shown in FIGS. 4A and 4B, a printing system (e.g., the printing system 10 shown in FIG. 7) may be used to apply the build material composition 16. The printing system 10 may include a build area platform 12, a build material supply 14 containing the build material composition 16, and a build material distributor 18.

The build area platform 12 receives the build material composition 16 from the build material supply 14. The build area platform 12 may be moved in the directions as denoted by the arrow 20 (see FIG. 7), e.g., along the z-axis, so that the build material composition 16 may be delivered to the build area platform 12 or to a previously formed layer. In an example, when the build material composition 16 is to be delivered, the build area platform 12 may be programmed to advance (e.g., downward) enough so that the build material distributor 18 can push the build material composition 16 onto the build area platform 12 to form a substantially uniform layer of the build material composition 16 thereon. The build area platform 12 may also be returned to its original position, for example, when a new part is to be built.

The build material supply 14 may be a container, bed, or other surface that is to position the build material composition 16 between the build material distributor 18 and the build area platform 12. In some examples, the methods 100, 200, 300 further include heating the build material composition 16 in the build material supply 14 to a supply temperature ranging from about 25° C. to about 150° C. In these examples, the supply temperature may depend, in part, on the build material composition 16 used and/or the 3D printer used. As such, the range provided is one example, and higher or lower temperatures may be used. The heating of the build material composition 16 in the build material supply 14 may be accomplished by heating the build material supply 14 to the supply temperature.

The build material distributor 18 may be moved in the directions as denoted by the arrow 22 (see FIG. 7), e.g., along the y-axis, over the build material supply 14 and across the build area platform 12 to spread the layer 54 of the build material composition 16 over the build area platform 12. The build material distributor 18 may also be returned to a position adjacent to the build material supply 14 following the spreading of the build material composition 16. The build material distributor 18 may be a blade (e.g., a doctor blade), a roller, a combination of a roller and a blade, and/or any other device capable of spreading the build material composition 16 over the build area platform 12. For instance, the build material distributor 18 may be a counter-rotating roller. In some examples, the build material supply 14 or a portion of the build material supply 14 may translate along with the build material distributor 18 such that build material composition 16 is delivered continuously to the material distributor 18 rather than being supplied from a single location at the side of the printing system 10 as depicted in FIG. 4A.

In FIG. 4A, the build material supply 14 may supply the build material composition 16 into a position so that it is ready to be spread onto the build area platform 12. The build material distributor 18 may spread the supplied build material composition 16 onto the build area platform 12. The controller 34 may process "control build material supply" data, and in response, control the build material supply 14 to appropriately position the particles of the build material composition 16, and may process "control spreader" data, and in response, control the build material distributor 18 to spread the supplied build material composition 16 over the build area platform 12 to form the layer 54 of build material composition 16 thereon. As shown in FIG. 4B, one build material layer 54 has been formed.

The layer 54 of the build material composition 16 has a substantially uniform thickness across the build area platform 12. In an example, the build material layer 54 has a thickness ranging from about 50 μm to about 120 μm. In another example, the thickness of the build material layer 54 ranges from about 30 μm to about 300 μm. It is to be understood that thinner or thicker layers may also be used. For example, the thickness of the build material layer 54 may range from about 20 μm to about 500 μm. The layer thickness may be about 2× (i.e., 2 times) the average diameter of the build material composition particles at a minimum for finer part definition. In some examples, the layer thickness may be about 1.2× the average diameter of the build material composition particles.

To form the object 44 shown in FIG. 3, this layer 54 of build material composition 16 would be patterned with the core fusing agent 28 (i.e., the core fusing agent 28 would be selectively dispensed on the layer 54 according to a pattern of a cross-section for the core layer 46), and then exposed to electromagnetic radiation to form the core layer 46. As used herein, the cross-section of the layer of the part to be formed refers to the cross-section that is parallel to the contact surface of the build area platform 12. As an example, if the core layer 46 is to be shaped like a cube or cylinder, the core fusing agent 28 will be deposited in a square pattern or a circular pattern (from a top view), respectively, on at least a portion of the layer 54 of the build material composition 16.

In the example shown in FIG. 4B, the layer 54 of build material composition 16 is a sacrificial layer that is used to enhance the color of the first layer (e.g., colored layer 52) of the object 44' that is being formed. As shown in FIG. 4B, the coloring agent 30 is selectively applied to at least the portion 56 of the layer 54. As such, the particles of the build material composition 16 in this portion 56 of the layer 54 become colored. In this example, this sacrificial layer 54 is not coalesced/fused (as no primer fusing agent 26, 26' or core fusing agent 28 is applied thereon). Rather, some of the colored particles of the build material composition 16 in the sacrificial layer 54 may become embedded in coalesced/fused build material composition of the part layer (e.g., colored layer 52) that is formed thereon. In other words, some of the colored build material composition 16 in portion 56 may become embedded in the surface of the part layer that is formed adjacent thereto. The non-coalesced/non-fused, but embedded colored build material composition 16 may help to maintain saturation at the surface (of the ultimately formed colored layer 52) by providing a colored interface between the colored layer 52 and surrounding non-coalesced/non-fused build material composition 16.

It is to be understood that the selective application of the coloring agent 30 may be accomplished in a single printing pass or in multiple printing passes. In an example, selectively applying of the coloring agent 30 is accomplished in multiple printing passes. In another example, the selectively applying of the coloring agent 30 is accomplished in a number of printing passes ranging from 2 to 4. It may be desirable to apply the coloring agent 30 in multiple printing passes to increase the amount of the colorant that is applied to the build material composition 16, to avoid liquid splashing, to avoid displacement of the build material composition 16, etc.

It is also to be understood that when an agent (e.g., the primer fusing agent 26, 26', the core fusing agent 28, the coloring agent 30, the detailing agent 42, etc.) is to be selectively applied to the build material composition 16, the agent 26, 26', 28, 30, 42 may be dispensed from an applicator 24A, 24B, 24C. The applicator(s) 24A, 24B, 24C may each be a thermal inkjet printhead, a piezoelectric printhead, a continuous inkjet printhead, etc., and the selective application of the agent(s) 26, 26', 28, 30, 42 may be accomplished by thermal inkjet printing, piezo electric inkjet printing, continuous inkjet printing, etc. The controller 36 may process data, and in response, control the applicator(s) 24A, 24B, 24C (e.g., in the directions indicated by the arrow 32, see FIG. 7) to deposit the agent(s) 26, 26', 28, 30, 42 onto predetermined portion(s) of the build material composition 16. Throughout the method 300, a single applicator may be labeled with multiple reference numbers (24A, 24B and/or 24C), although it is to be understood that the applicators may be separate applicators or a single applicator with several individual cartridges for dispensing the respective agents 26, 26', 28, 30, 42.

While not shown in FIG. 4B, the detailing agent 42 may be selectively applied on the portion 56 with the coloring agent 30. The detailing agent 42 may be used to maintain the temperature of the build material composition 16 in contact therewith below the melting point of the semi-crystalline thermoplastic polymer, below the lowest temperature in the melting range of the semi-crystalline thermoplastic polymer, or below the softening point/glass transition temperature of the amorphous thermoplastic polymer of the build material composition 16. Since the sacrificial layer 54 is not to be coalesced/fused, the detailing agent 42 may be applied to this layer 54 with the coloring agent 30.

Additionally, while one sacrificial layer 54 is shown, it is to be understood that several sacrificial layers 54 may be sequentially formed in contact with one another.

The color of the coloring agent 30 that is applied to the portion(s) 56 of the sacrificial layer 54 will depend upon the desired color for the object 44' or at least the portion of the colored layer 52 formed adjacent thereto. As examples, a black agent, a cyan agent, a magenta agent, or a yellow agent may be applied alone or in combination to achieve a variety of colors.

The coloring agent 30 will penetrate at least partially into the sacrificial layer 54. Depending upon the particle size of the colorant in the coloring agent 30 and size of the voids between the particles of the build material composition 16, the coloring agent 30 may penetrate throughout the entire thickness of the sacrificial layer 54. This creates a surface upon which a subsequent layer 58 of build material composition 16 may be applied.

The layer 58 of the build material composition 16 may be applied in the same manner as the layer 54. The layer 58 is shown in FIG. 4C. The layer 58 may be considered to be the first build material layer because at least a portion of this layer 58 will be coalesced/fused to form the first layer of the 3D object 44' (since the sacrificial layer 54 is not coalesced/fused).

After the build material composition 16 has been applied, and prior to further processing, the build material layer 58 may be exposed to heating. Heating may be performed to pre-heat the build material composition 16. In an example, the heating temperature may be below the melting point of the semi-crystalline thermoplastic polymer of the build material composition 16. In another example, the heating temperature may be below the lowest temperature in the melting range of the semi-crystalline thermoplastic polymer of the build material composition 16. In still another example, the heating temperature may be below the softening point/glass transition temperature of the amorphous thermoplastic polymer of the build material composition 16. As such, the temperature selected will depend upon the build material composition 16 that is used.

As examples, the pre-heating temperature may be from about 5° C. to about 50° C. below the melting point of the semi-crystalline thermoplastic polymer, from about 5° C. to about 50° C. below the lowest temperature in the melting range of the semi-crystalline thermoplastic polymer, or from about 5° C. to about 50° C. below the softening point/glass transition temperature of the amorphous thermoplastic polymer. In an example, the pre-heating temperature ranges from about 50° C. to about 205° C. In another example, the pre-heating temperature ranges from about 100° C. to about 205° C. In still another example, the pre-heating temperature ranges from about 100° C. to about 190° C. In yet another example, the methods 100, 200, 300 further include, prior to the selectively applying of the fusing agent 26, 26', 28, pre-heating the build material composition 16 to a pre-heating temperature ranging from about 5° C. to about 50° C. below the melting point of the semi-crystalline thermoplastic polymer, from about 5° C. to about 50° C. below the lowest temperature in the melting range of the semi-crystalline thermoplastic polymer, or from about 5° C. to about 50° C. below the softening point/glass transition temperature of the amorphous thermoplastic polymer. The low pre-heating temperature may enable the non-patterned build material composition 16 to be easily removed from the 3D object 44' after completion of the 3D object 44'. In these examples, the pre-heating temperature may depend, in part, on the build material composition 16 used. As such, the ranges provided are some examples, and higher or lower temperatures may be used.

Pre-heating the layer 58 of the build material composition 16 may be accomplished by using any suitable heat source that exposes all of the build material composition 16 on in the layer 58 to the heat. Examples of the heat source include a thermal heat source (e.g., a heater (not shown) integrated into the build area platform 12 (which may include sidewalls)) or the radiation source 38, 38' (see, e.g., FIG. 7).

After the layer 58 is formed, and in some instances is pre-heated, the primer fusing agent 26, 26' and the coloring agent 30 are selectively applied on the same portion(s) 60 of the build material composition 16 in the layer 58.

As mentioned above, the primer fusing agent 26, 26' includes an aqueous or non-aqueous vehicle and an energy absorber having absorption at wavelengths ranging from 800 nm to 4000 nm and transparency at wavelengths ranging from 400 nm to 780 nm dispersed therein. The fusing agent 26' is one specific example of the low tint or primer fusing agent, which includes CTO nanoparticles as the energy absorber, a zwitterionic stabilizer, and an aqueous vehicle. Example compositions of the primer fusing agent 26, 26' are described above.

When the desired color for the object 44' or a particular colored layer 52 of the object 44' is the color of the coloring agent 30, the primer fusing agent 26, 26' is applied with the coloring agent 30. Since the primer fusing agent 26, 26' is clear or slightly tinted, the color of the coloring agent 30 will be the color of the resulting colored layer 52, as the colorants of the coloring agent 30 become embedded throughout the coalesced/fused build material composition of the colored layer 52. The primer fusing agent 26, 26' may be particularly suitable for obtaining lighter colors or white.

The primer fusing agent 26, 26' and the coloring agent 30 are selectively applied in a pattern of a cross-section for the colored layer 52 that is to be formed (shown in FIG. 4D). In the example shown in FIG. 4C, the portion 60 is adjacent to the portion 56 of the layer 54 to which the coloring agent 30 has been applied.

It is to be understood that the selective application of the primer fusing agent 26, 26' may be accomplished in a single printing pass or in multiple printing passes. In an example, selectively applying of the primer fusing agent 26, 26' is accomplished in multiple printing passes. In another example, the selectively applying of the primer fusing agent 26, 26' is accomplished in a number of printing passes ranging from 2 to 4. In still another example, selectively applying of the primer fusing agent 26, 26' is accomplished in 2 printing passes. In yet another example, selectively applying of the primer fusing agent 26, 26' is accomplished in 4 printing passes. It may be desirable to apply the primer fusing agent 26, 26' in multiple printing passes to increase the amount of the energy absorber that is applied to the build material composition 16, to avoid liquid splashing, to avoid displacement of the build material composition 16, etc.

The volume of the primer fusing agent 26, 26' that is applied per unit of the build material composition 16 in the patterned portion 60 may be sufficient to absorb and convert enough electromagnetic radiation so that the build material composition 16 in the patterned portion 60 will coalesce/fuse. The volume of the primer fusing agent 26, 26' that is applied per unit of the build material composition 16 may depend, at least in part, on the energy absorber used, the energy absorber loading in the primer fusing agent 26, 26', and the build material composition 16 used.

After the primer fusing agent 26, 26' and the coloring agent 30 are selectively applied in the specific portion(s) 60 of the layer 58, the entire layer 58 of the build material composition 16 is exposed to electromagnetic radiation (shown as EMR Exposure between FIGS. 4C and 4D).

The electromagnetic radiation is emitted from the radiation source 38, 38'. The length of time the electromagnetic radiation is applied for, or energy exposure time, may be dependent, for example, on one or more of: characteristics of the radiation source 38, 38'; characteristics of the build material composition 16; and/or characteristics of the primer fusing agent 26, 26'.

It is to be understood that the exposing of the build material composition 16 to electromagnetic radiation may be accomplished in a single radiation event or in multiple radiation events. In an example, the exposing of the build material composition 16 is accomplished in multiple radiation events. In another example, the exposing of the build material composition 16 to electromagnetic radiation may be accomplished in a number of radiation events ranging from 3 to 8. In still another example, the exposing of the build material composition 16 to electromagnetic radiation may be accomplished in 3 radiation events. It may be desirable to expose the build material composition 16 to electromagnetic radiation in multiple radiation events to counteract a cooling effect that may be brought on by the amount of the primer fusing agent 26, 26' that is applied to the build material layer 58. Additionally, it may be desirable to expose the build material composition 16 to electromagnetic radiation in multiple radiation events to sufficiently elevate the temperature of the build material composition 16 in the portion(s) 60, without over heating the build material composition 16 in the non-patterned portion(s).

The primer fusing agent 26, 26' enhances the absorption of the radiation, converts the absorbed radiation to thermal energy, and promotes the transfer of the thermal heat to the build material composition 16 in contact therewith. In an example, the primer fusing agent 26, 26' sufficiently elevates the temperature of the build material composition 16 in the layer 58 to a temperature above the melting point of the semi-crystalline thermoplastic polymer, within or above the melting range of the semi-crystalline thermoplastic polymer, or above the softening point/glass transition temperature of the amorphous thermoplastic polymer of the build material composition 16, allowing coalescing/fusing (e.g., thermal merging, melting, binding, etc.) of the build material composition 16 to take place. The application of the electromagnetic radiation forms the colored layer 52, shown in FIG. 4D.

In some examples of the methods 100, 200, 300, the electromagnetic radiation has a wavelength ranging from 800 nm to 4000 nm. In another example the electromagnetic radiation has a wavelength ranging from 800 nm to 1400 nm. In still another example, the electromagnetic radiation has a wavelength ranging from 800 nm to 1200 nm. Radiation having wavelengths within the provided ranges may be absorbed (e.g., 80% or more of the applied radiation is absorbed) by the primer fusing agent 26, 26' and may heat the build material composition 16 in contact therewith, and may not be substantially absorbed (e.g., 25% or less of the applied radiation is absorbed) by the non-patterned build material composition 16.

It is to be understood that portions of the build material composition 16 that do not have the primer fusing agent 26, 26' applied thereto do not absorb enough radiation to coalesce/fuse. As such, these portions do not become part of the 3D object 44' that is ultimately formed. However, the generated thermal energy may propagate into the surrounding build material composition 16 that does not have primer fusing agent 26, 26' applied thereto. The propagation of thermal energy may be inhibited from coalescing/fusing the non-patterned build material composition 16 in the layer 58, for example, when the detailing agent 42 is applied to the build material composition 16 in the layer 58 that are not exposed to the primer fusing agent 26, 26'. Moreover, the propagation of thermal energy may be inhibited from coalescing/fusing the build material composition 16 in the layer 54 when the detailing agent 42 is applied with the coloring agent 30 in the layer 54. However, as mentioned above, some of the colored build material composition 16 in the layer 54 may become embedded in the adjacent surface of the coalesced/fused build material composition of the colored layer 52.

While a single colored layer 52 is shown, it is to be understood that several colored layers 52 may be sequentially formed in contact with one another so that a color region (thicker than one voxel) is built up around the core layer(s) 46 in the final object 44'. The outermost colored layer 52 may form a one voxel deep shell, and the other colored layers may create the thicker color region. The levels of the primer fusing agent 26, 26' and the coloring agent 30 may be higher in the outermost colored layer 52, compared to other colored layers positioned closer to the core layer(s) 46, in order to increase color saturation at the exterior of the formed object 44'.

FIG. 4D also illustrates yet another layer 62 of the build material composition 16, this time the layer 62 being applied to the colored layer 52 and to any non-coalesced/non-fused build material composition 16 of layer 58. The layer 62 may be applied in the same manner as the layers 54, 58.

Prior to further processing, the layer 62 of the build material composition 16 may be exposed to pre-heating in the manner previously described.

After the layer 62 is formed, and in some instances is pre-heated, the primer fusing agent 26, 26' is selectively applied on portion(s) 64 of the build material composition 16 in the layer 62. The portion(s) 64 of the layer 62 will form the primer layer 48', which is white, clear, or slightly tinted from the primer fusing agent 26, 26'. This primer layer 48' is positioned between the colored layer 52 and subsequently formed black core layer(s) 46 in the object 44' (see FIG. 4H). This primer layer 48' may be referred to as the initial layer or the first primer layer. The primer layer 48' optically isolates at least a portion of the black core layer(s) 46.

Figure 4E:
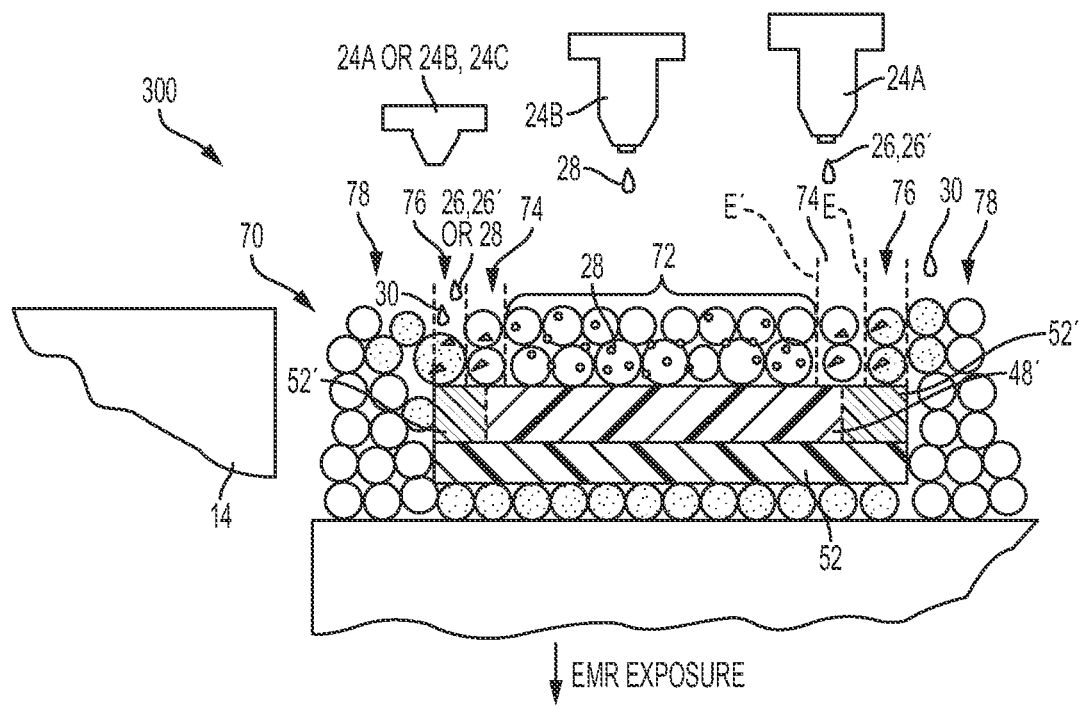

In the example shown in FIG. 4D, the portion 64 to which the primer fusing agent 26, 26' is selectively applied is adjacent to part (but not all) of the already formed colored layer 52. Selectively applying the primer fusing agent 26, 26' in this manner may be performed when it is desirable to form colored layer(s) 52' (shown in FIG. 4E) along the sides of the object 44' that is being formed. To form the colored layer(s) 52' along the sides of the object 44', the primer fusing agent 26, 26' and the coloring agent 30 are selectively applied on other portion(s) 66 of the build material composition 16 in the layer 62. As an example, the portion(s) 66 may define the perimeter of that particular layer of the object 44' that is being formed, and may be outside of a perimeter or an edge boundary E (i.e., the outermost portions where the primer fusing agent 26, 26' alone is selectively deposited in any build material layer) of the portion 64.

When it is desirable to form the colored layer 52' (shown in FIG. 4E) along the sides of the object 44' that is being formed, it may also be desirable to selectively deposit the coloring agent 30 (with or without the detailing agent 42) in portion(s) 68 of the non-patterned build material composition 16 which are adjacent to or surround the portion(s) 66 (which when coalesced/fused, will form the colored layer 52' along the sides of the object 44'). The colored build material composition 16 in the portion(s) 68 may become embedded in coalesced/fused build material composition of the colored layer 52'. This non-coalesced/non-fused, but embedded colored build material composition 16 may help to maintain saturation at the surface (of the colored layer 52') by providing a colored interface between the colored layer 52' and surrounding non-coalesced/non-fused build material composition 16.

After the primer fusing agent 26, 26' is applied on the portion(s) 64, and in some instances the primer fusing agent 26, 26' and the coloring agent 30 are selectively applied on the portion(s) 66, the entire layer 62 of the build material composition 16 is exposed to electromagnetic radiation (shown as EMR Exposure between FIGS. 4D and 4E) in the manner previously described. Exposure to electromagnetic radiation forms the primer layer 48', as shown in FIG. 4E.

If the primer fusing agent 26, 26' and the coloring agent 30 are selectively applied on the portion(s) 66, the EMR exposure will form colored layer(s) 52' at the outer edge(s). This exposure to electromagnetic radiation forms the colored layer(s) 52', as shown in FIG. 4E.

The width of the colored layer(s) 52' may be large enough to form the color region at this portion of the object 44'. The levels of the primer fusing agent 26, 26', and the coloring agent 30 may be higher at the outermost edge of the colored layer(s) 52', compared to the innermost edge(s) of the colored layer(s) 52', in order to increase color saturation at the exterior of the formed object 44'.

FIG. 4E also illustrates yet another layer 70 of the build material composition 16, this time the layer 70 being applied to the primer layer 48', the colored layer(s) 52', and to any non-coalesced/non-fused build material composition 16 of layer 62. The layer 70 may be applied in the same manner as the layers 54, 58, 62.

Prior to further processing, the layer 70 of the build material composition 16 may be exposed to pre-heating in the manner previously described.

After the layer 70 is formed, and in some instances is pre-heated, the core fusing agent 28 is selectively applied on portion(s) 72 of the build material composition 16 in the layer 70. In one example, the method 200 includes: based on a 3D object model, selectively applying a core fusing agent 28 on at least a portion 72 of a (first) layer 70 of a build material composition 16, the core fusing agent 28 including an energy absorber having absorption at least at wavelengths ranging from 400 nm to 780 nm, and the build material composition 16 including a semi-crystalline or amorphous thermoplastic polymer.

As mentioned above, the core fusing agent 28 includes at least an aqueous or non-aqueous vehicle and an active material dispersed or dissolved therein.

It is to be understood that the selective application of the core fusing agent 28 may be accomplished in a single printing pass or in multiple printing passes. In an example, selectively applying of the core fusing agent 28 is accomplished in multiple printing passes. In another example, the selectively applying of the core fusing agent 28 is accomplished in a number of printing passes ranging from 2 to 4. In still another example, selectively applying of the core fusing agent 28 is accomplished in 2 printing passes. In yet another example, selectively applying of the core fusing agent 28 is accomplished in 4 printing passes. It may be desirable to apply the core fusing agent 28 in multiple printing passes to increase the amount of the energy absorber that is applied to the build material composition 16, to avoid liquid splashing, to avoid displacement of the build material composition 16, etc.

The volume of the core fusing agent 28 that is applied per unit of the build material composition 16 in the patterned portion 72 may be sufficient to absorb and convert enough electromagnetic radiation so that the build material composition 16 in the patterned portion 72 will coalesce/fuse. The volume of the core fusing agent 28 that is applied per unit of the build material composition 16 may depend, at least in part, on the energy absorber used, the energy absorber loading in the core fusing agent 28, and the build material composition 16 used.

The portion(s) 72 of the layer 70 will form the core layer 46 (FIG. 4F), which may be black from the core fusing agent 28. While a single core layer 46 is shown, it is to be understood that several core layers 46 may be sequentially formed in contact with one another so that a core region (or part core) is built up, which makes up the bulk of the object 44'. Several core layers 46 may enhance the mechanical properties of the object 44'.

In the example shown in FIG. 4E, the portion 72 to which the core fusing agent 28 is selectively applied is adjacent to part (but not all) of the already formed primer layer 48'. Selectively applying the core fusing agent 28 in this manner may be performed when it is desirable to form colored layer(s) 52' (shown in FIG. 4F) along the sides of the object 44' that is being formed. Since the core layer 46 being formed may be black, it may also be desirable to form the primer layer 48" between the core layer 46 and the adjacent colored layer(s) 52'.

To form the primer layer 48" along the perimeter of the core layer 46, the primer fusing agent 26, 26' is selectively applied on other (or second) portion(s) 74 of the build material composition 16 in the layer 70 that are immediately adjacent to the perimeter or edge boundary E' (i.e., the outermost portions where the core fusing agent 28 alone is selectively deposited in any build material layer) of the portion 72. The perimeter/edge boundary E' is thus defined by the core fusing agent 28. To form the colored layer(s) 52' along/adjacent to the perimeter of the primer layer 48", the primer fusing agent 26, 26' and the coloring agent 30 are selectively applied on still other (or third) portion(s) 76 of the build material composition 16 in the layer 70 that are immediately adjacent to the perimeter or edge boundary E of the portion 74 (which is defined by the primer fusing agent 26, 26').

When it is desirable to form the colored layer(s) 52' (shown in FIG. 4F) along the sides of the object 44' that is being formed, it may also be desirable to selectively deposit the coloring agent 30 (with or without the detailing agent 42) in portion(s) 78 of the non-patterned build material composition 16 which are adjacent to or surround the portion(s) 76 (which when coalesced/fused, will form the colored layer 52' along the sides of the object 44').

After the layer 70 is patterned in a desirable manner with at least the core fusing agent 28, the entire layer 70 of the build material composition 16 is exposed to electromagnetic radiation (shown as EMR Exposure between FIGS. 4E and 4F) in the manner previously described, except that the wavelength range may be expanded to as low as 400 nm because some of the energy absorbers in the core fusing agent 28 can absorb visible light as well as infrared light. In one example, the method 200 includes: exposing the (first) layer 70 to electromagnetic radiation to fuse the build material composition 16 in the at least the portion 72 of the (first) layer 70 to form a core layer 46.

The core fusing agent 28 enhances the absorption of the radiation in portion 72, converts the absorbed radiation to thermal energy, and promotes the transfer of the thermal heat to the build material composition 16 in contact therewith. In an example, the core fusing agent 28 sufficiently elevates the temperature of the build material composition 16 in portion 72 to a temperature above the melting point of the semi-crystalline thermoplastic polymer, within or above the melting range of the semi-crystalline thermoplastic polymer, or above the softening point/glass transition temperature of the amorphous thermoplastic polymer of the build material composition 16, allowing coalescing/fusing (e.g., thermal merging, melting, binding, etc.) of the build material composition 16 to take place. Exposure to electromagnetic radiation forms the core layer 46, as shown in FIG. 4F.

Figure 4F:
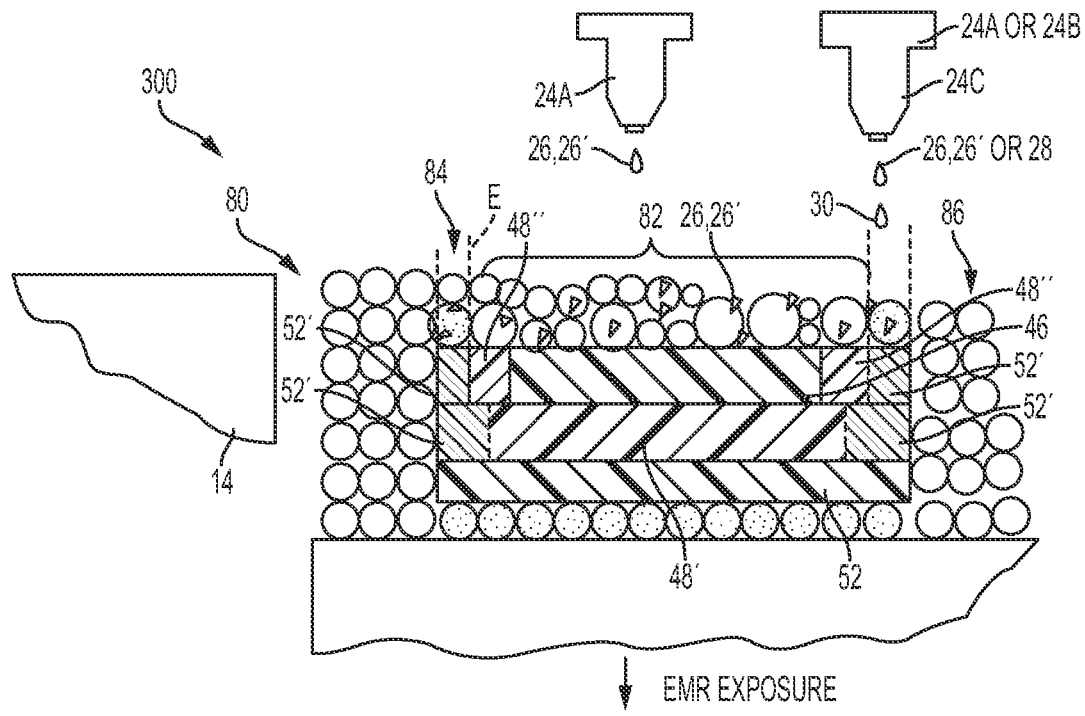

If the primer fusing agent 26, 26' is selectively applied on the portion(s) 74, and the primer fusing agent 26, 26' and the coloring agent 30 are selectively applied on the portion(s) 76, the EMR exposure will also form primer layer(s) 48" and colored layer(s) 52' at the outer edge(s) of the core layer 46, as shown in FIG. 4F.

The width of the primer layer(s) 48" may be large enough to optically isolate the black core layer 46.

FIG. 4F also illustrates yet another layer 80 of the build material composition 16, this time the layer 80 being applied to the core layer 46, the primer layer(s) 48", the colored layer(s) 52', and to any non-coalesced/non-fused build material composition 16 of layer 70. The layer 80 may be applied in the same manner as the layers 54, 58, 62, 70. In one example, the method 200 includes: applying a second layer 80 of the build material composition 16 on the core layer 46.

Prior to further processing, the layer 80 of the build material composition 16 may be exposed to pre-heating in the manner previously described.

After the layer 80 is formed, and in some instances is pre-heated, the primer fusing agent 26, 26' is selectively applied on portion(s) 82 of the build material composition 16 in the layer 80. In one example, the method 200 includes: based on the 3D object model, selectively applying a primer fusing agent 26, 26' on at least a portion 82 of the second layer 80, the primer fusing agent 26, 26' including an energy absorber having absorption at wavelengths ranging from 800 nm to 4000 nm and having transparency at wavelengths ranging from 400 nm to 780 nm.

The portion(s) 82 of the layer 80 will form another primer layer 48''', which is white or slightly tinted from the primer fusing agent 26, 26'. This primer layer 48''' is positioned between the black core layer(s) 46 and subsequently formed colored layer(s) 52" in the object 44' (see FIG. 4H). As such, the primer layer 48''' optically isolates the black core layer(s) 46 at another end of the formed object 44'.

In the example shown in FIG. 4F, the portion 82 to which the primer fusing agent 26, 26' is selectively applied is adjacent to the already formed core layer(s) 46 and primer layer(s) 48". Selectively applying the primer fusing agent 26, 26' in this manner may be performed when it is desirable to form colored layer(s) 52' (shown in FIG. 4G) along the sides of the object 44' that is being formed. To form the colored layer(s) 52' along the sides of the object 44', the primer fusing agent 26, 26' and the coloring agent 30 are selectively applied on portion(s) 84 of the build material composition 16 in the layer 82. As an example, the portion(s) 84 may define the perimeter of that particular layer of the object 44' that is being formed, and may be outside of an edge boundary E of the portion 82.

When it is desirable to form the colored layer 52' (shown in FIG. 4G) along the sides of the object 44' that is being formed, it may also be desirable to selectively deposit the coloring agent 30 (with or without the detailing agent 42) in portion(s) 86 of the non-patterned build material composition 16 which are adjacent to or surround the portion(s) 84 (which when coalesced/fused, will form the colored layer 52' along the sides of the object 44').

Figure 4G:
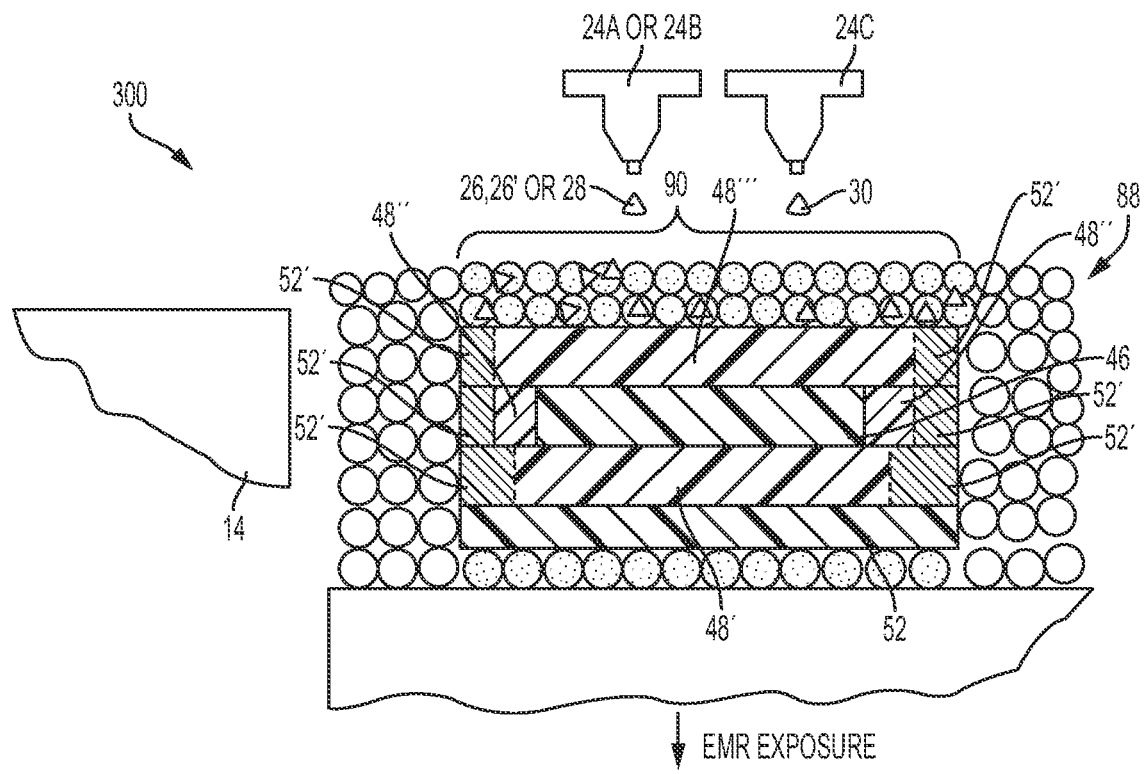

After the primer fusing agent 26, 26' is applied on the portion(s) 82, and in some instances the primer fusing agent 26, 26' and the coloring agent 30, are selectively applied on the portion(s) 84, the entire layer 80 of the build material composition 16 is exposed to electromagnetic radiation (shown as EMR Exposure between FIGS. 4F and 4G) in the manner previously described. Exposure to electromagnetic radiation forms the primer layer 48''', as shown in FIG. 4G. In one example, the method 200 includes: exposing the second layer 80 to electromagnetic radiation to fuse the build material composition 16 in the at least the portion 82 of the second layer 80 to form a primer layer 48'''.

If the primer fusing agent 26, 26' and the coloring agent 30 are selectively applied on the portion(s) 84, the EMR exposure will form colored layer(s) 52' at the outer edge(s) of the primer layer 48'''. This exposure to electromagnetic radiation forms the colored layer(s) 52', as shown in FIG. 4G.

FIG. 4G also illustrates yet another layer 88 of the build material composition 16, this time the layer 88 being applied to the primer layer(s) 48''' and the colored layer(s) 52' adjacent thereto, and to any non-coalesced/non-fused build material composition 16 of layer 80. The layer 88 may be applied in the same manner as the layers 54, 58, 62, 70, 80.

Prior to further processing, the layer 88 of the build material composition 16 may be exposed to pre-heating in the manner previously described.

After the layer 88 is formed, and in some instances is pre-heated, the primer fusing agent 26, 26' and the coloring agent 30 are selectively applied on the same portion(s) 90 of the build material composition 16 in the layer 88.

Figure 4H:
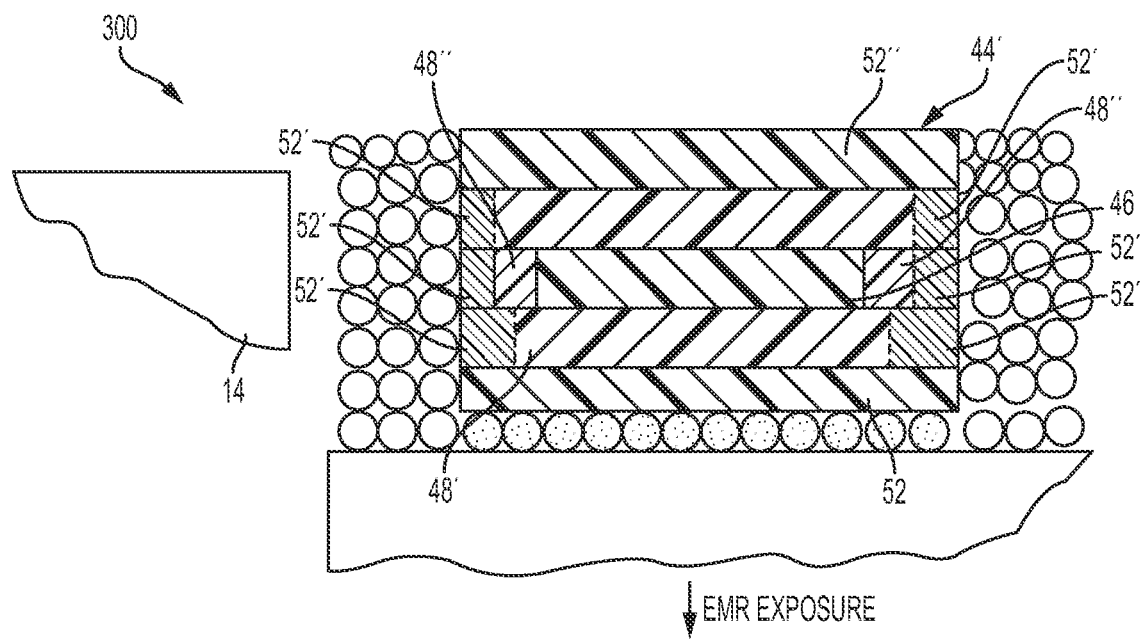

The primer fusing agent 26, 26' and the coloring agent 30 are selectively applied in a pattern of a cross-section for the colored layer 52'' that is to be formed (shown in FIG. 4H). In the example shown in FIG. 4G, the portion 90 is adjacent to the primer layer 48''' and the colored layer(s) 52' is adjacent to the primer layer 48'''.

When the desired color for the object 44' or a particular colored layer 52'' of the object 44' is the color of the coloring agent 30, the primer fusing agent 26, 26' is applied with the coloring agent 30. Since the primer fusing agent 26, 26' is clear or slightly tinted and the build material composition 16 is white, the color of the coloring agent 30 will be the color of the resulting colored layer 52'', as the colorants of the coloring agent 30 become embedded throughout the coalesced/fused build material composition of the colored layer 52''. The primer fusing agent 26, 26' may be particularly suitable for obtaining lighter colors or white.

It may also be desirable to selectively deposit the coloring agent 30 (with or without the detailing agent 42) in portion(s) of the non-patterned build material composition 16 which are adjacent to or surround the portion(s) 90 (which when coalesced/fused, will form the colored layer 52'' along the top surface of object 44'). The colored build material composition 16 in the non-patterned portion(s) may become embedded in coalesced/fused build material composition along the sides or edges of the colored layer 52''. The non-coalesced/non-fused, but embedded colored build material composition 16 may help to maintain saturation at the surface (of the colored layer 52'') by providing a colored interface between the colored layer 52'' and surrounding non-coalesced/non-fused build material composition 16.

After the primer fusing agent 26, 26' and the coloring agent 30 are selectively applied in the specific portion(s) 90 of the layer 88, the entire layer 88 of the build material composition 16 is exposed to electromagnetic radiation (shown as EMR Exposure between FIGS. 4G and 4H).

The electromagnetic radiation is emitted from the radiation source 38, 38' in the manner previously described, with wavelengths suitable for the primer fusing agent 26, 26'. Exposure to electromagnetic radiation forms the colored layer 52'', as shown in FIG. 4H, having colorants of the coloring agent 30 embedded therein.

While a single colored layer 52'' is shown, it is to be understood that several colored layers 52'' may be sequentially formed in contact with one another so that a color region (thicker than one voxel) is built up around the core layer(s) 46 in the final object 44'. The outermost colored layer 52'' may form a one voxel deep shell, and the other colored layers may create the thicker color region. The levels of the primer fusing agent 26, 26' and the coloring agent 30 may be higher in the outermost colored layer 52'', compared to other colored layers positioned closer to the core layer(s) 46, in order to increase color saturation at the exterior of the formed object 44'.

While not shown, the coloring agent 30 may be selectively applied to the colored layer 52''.

The coloring agent 30 applied to the colored layer 52'' may help to maintain saturation at the surface of the colored layer 52'' by coloring the build material composition particles at the surface, whether these particles are coalesced/fused, or non-coalesced/non-fused and embedded in the coalesced/fused particles.

Also while not shown, it is to be understood that the detailing agent 42 may be selectively applied on the colored layer 52'' with the coloring agent 30.

Throughout the methods 100, 200, 300, the color of the coloring agent 30 that is applied will depend upon the desired color for the object 44' or at least the portion of the colored layer(s) 52, 52', 52'' to be formed. As examples, a black agent, a cyan agent, a magenta agent, or a yellow agent may be applied alone or in combination to achieve a variety of colors.

It is to be understood that the methods 100, 200, 300 may be modified so that the core fusing agent 28, rather than the primer fusing agent 26, 26', is applied with the coloring agent 30 to form the colored layers 52, 52', 52''. The primer fusing agent 26, 26' may be particularly suitable for obtaining lighter colors or white. When the desired color for colored layer 52 is a darker color or black, the core fusing agent 28 may be applied with the coloring agent 30.

It is to be further understood that the methods 100, 200, 300 may be modified so that the sacrificial layer 54 (with the coloring agent 30 thereon) and the outer colored layers 52, 52', 52'' are not formed. In this modified form of the methods 100, 200, 300, the primer layer 48' would be formed first. In the resulting part, all of the primer layers 48', 48'', 48''' would be exposed/visible, and thus would form the exterior of the part. In this example, the primer layers 48', 48'', 48''' would form an outer white layer which encapsulates the core layer(s) 46. When the methods 100, 200, 300 are modified in this manner, the part that is formed is white or slightly tinted (depending upon the color of the primer fusing agent 26, 26').

Upon completion of the object 44', the object 44' is cooled at a rate ranging from about greater than 0° C./minute to about 100° C./minute. In some examples, the object 44' is cooled at a rate ranging from about greater than 0° C./minute to about 40° C./minute. In one example, the method 200 includes: upon completion of a 3D object 44' including the core layer 46 and the primer layer 48''', cooling the 3D object 44' at a rate ranging from about greater than 0° C./minute to about 100° C./minute, wherein the 3D object 44' exhibits a total dimension change ranging from about −4% to about 9% after cooling.

In some examples, the cooling of the object 44' may be accomplished by maintaining the object 44' in an environment having a temperature ranging from about 15° C. to 30° C. until the temperature of the 3D object 44' reaches the temperature of the environment.

After cooling, the 3D object 44' exhibits a total dimension change ranging from about −4% to about 9%. In some examples, the total dimension change exhibited by the 3D object 44' after cooling ranges from about 2% to about 9%. In other examples, the total dimension change exhibited by the 3D object 44' after cooling ranges from about −4% to less than 0%. In still other examples, (i) the semi-crystalline or amorphous thermoplastic polymer is a polyamide 11 and the total dimension change exhibited by the 3D object 44' after cooling ranges from about 5% to about 9%; or (ii) the semi-crystalline or amorphous thermoplastic polymer is a polyamide 12 and the total dimension change exhibited by the 3D object 44' after cooling ranges from about 4% to about 6%; or (iii) the semi-crystalline or amorphous thermoplastic polymer is a polyamide 12-$TiO_2$ and the total dimension change exhibited by the 3D object 44' after cooling ranges from about 4% to about 6%; or (iv) the semi-crystalline or amorphous thermoplastic polymer is a polyamide 12-GB and the total dimension change exhibited by the 3D object 44' after cooling ranges from about 3% to about 5%; or (v) the semi-crystalline or amorphous thermoplastic polymer is a polypropylene and the total dimension change ranges exhibited by the 3D object 44' after cooling from about −4% to about 7%.

The method 400 to form the object 44" will now be discussed in reference to FIGS. 5A through 5C. It is to be understood that the method 400 may be another example of the method 100.

In FIG. 5A, a layer 94 of the build material composition 16 is applied on the build area platform 12. The layer 94 may be applied in the same manner as described above.

The layer 94 of the build material composition 16 may be exposed to pre-heating in the manner described herein.

After the layer 94 is applied, and in some instances is pre-heated, the primer fusing agent 26, 26' is selectively applied on portion(s) 96 of the build material composition 16 in the layer 94. While the primer fusing agent 26' is shown in FIGS. 5A and 5C, it is to be understood that the primer fusing agent 26 may be used instead of the primer fusing agent 26'.

The portion(s) 96 of the layer 94 will form the first layer 98 of the 3D object 44" (FIG. 5C) being formed. As such, the primer fusing agent 26, 26' is selectively dispensed on the layer 94 according to a pattern of a cross-section for the layer 98.

After the primer fusing agent 26, 26' is applied on the portion(s) 96, the entire layer 94 of the build material composition 16 is exposed to electromagnetic radiation (shown as EMR Exposure between FIGS. 5A and 5B) in the manner previously described.

In this example, the primer fusing agent 26, 26' sufficiently elevates the temperature of the build material composition 16 in portion 96 to a temperature above the melting point of the semi-crystalline thermoplastic polymer, within or above the melting range of the semi-crystalline thermoplastic polymer, or above the softening point/glass transition temperature of the amorphous thermoplastic polymer of the build material composition 16, allowing coalescing/fusing (e.g., thermal merging, melting, binding, etc.) of the build material composition 16 to take place. Exposure to electromagnetic radiation forms the layer 98, as shown in FIG. 5B.

It is to be understood that portions of the build material composition 16 that do not have the primer fusing agent 26, 26' applied thereto do not absorb enough energy to coalesce/fuse.

Figure 5C:
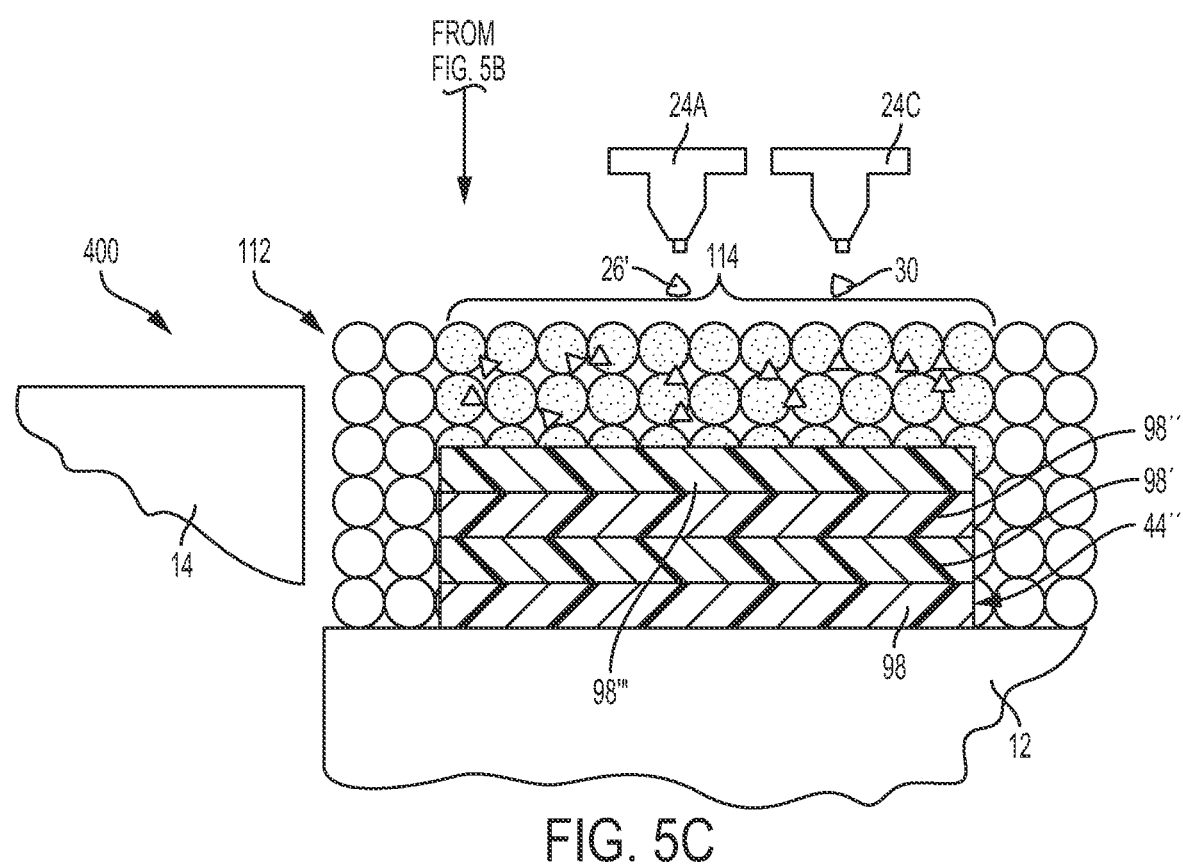

After the layer 98 is formed, additional layer(s) (e.g., 98', 98", 98''' shown in FIG. 5C) may be formed thereon to create an example of the 3D object 44" (shown in FIG. 5C). For example, to form the other layer 98', additional build material composition 16 may be applied on the layer 98. The primer fusing agent 26, 26' is then selectively applied on at least a portion of the additional build material composition 16, according to a pattern of a cross-section for the layer (e.g., 98') which is being formed. After the primer fusing agent 26, 26' is applied, the entire layer of the additional build material composition 16 is exposed to electromagnetic radiation in the manner previously described. The application of additional build material composition 16, the selective application of the primer fusing agent 26, 26', and the electromagnetic radiation exposure may be repeated a predetermined number of cycles to form the object 44".

In the example shown in FIGS. 5A through 5C, color may be imparted to the entire object 44" by applying the coloring agent 30 with the primer fusing agent 26, 26' in each of the portions of the respective build material layers that form layers 98, 98', 98", 98'''.

The methods 100, 400 may end at the formation of object 44" or color may be imparted to the top surface of the object 44". This is shown in FIG. 5C.

To impart color, a final layer 112 of the build material composition 16 is applied to the object 44". As shown in FIG. 5C, this layer 112 is applied to the outermost layer 98''' of the object 44". Prior to further processing, the layer 112 may be exposed to pre-heating in the manner previously described.

After the layer 112 is formed, and in some instances is pre-heated, the primer fusing agent 26, 26' and the coloring agent 30 are selectively applied on the same portion(s) 114 of the build material composition 16 in the layer 112. The primer fusing agent 26, 26' and the coloring agent 30 are selectively applied in a pattern of a cross-section for the colored layer that is to be formed (not shown). The color of the coloring agent 30 that is applied will depend upon the desired color for the part.

After the primer fusing agent 26, 26' and the coloring agent 30 are applied, the entire layer 112 of the build material composition 16 is exposed to electromagnetic radiation in the manner previously described. The primer fusing agent 26, 26' sufficiently elevates the temperature of the build material composition 16 in the portion 114 of the layer 112 to a temperature above the melting point of the semi-crystalline thermoplastic polymer, within or above the melting range of the semi-crystalline thermoplastic polymer, or above the softening point/glass transition temperature of the amorphous thermoplastic polymer of the build material composition 16, allowing coalescing/fusing (e.g., thermal merging, melting, binding, etc.) of the build material composition 16 (in contact with the primer fusing agent 26, 26') to take place. Exposure to electromagnetic radiation forms the colored layer (not shown), having colorants of the coloring agent 30 embedded therein.

It is to be understood that several colored layers may be sequentially formed in contact with one another so that a color region (thicker than one voxel) is built up on the layers 98, 98', 98'', 98''' in the final part. The outermost colored layer may form a one voxel deep shell, and the other colored layers may create the thicker color region. The levels of the primer fusing agent 26, 26' and the coloring agent 30 may be higher in the outermost colored layer, as compared to other colored layers positioned closer to the layer 98''', in order to increase color saturation at the exterior of the formed object 44''.

While not shown, the coloring agent 30 may be selectively applied to the colored layer. The coloring agent 30 applied to the colored layer may help to maintain saturation at the surface of the colored layer by coloring the build material composition particles at the surface, whether these particles are coalesced/fused or non-coalesced/non-fused and embedded in the coalesced/fused particles.

It is to be understood that the methods 100, 400 may also be modified similarly to the method 300 in order to form colored layers (e.g., 52 and 52') so that the part is completely encapsulated by colored layers.

Upon completion of the object 44'', the object 44'' is cooled at a rate ranging from about greater than 0° C./minute to about 100° C./minute. In some examples, the object 44'' is cooled at a rate ranging from about greater than 0° C./minute to about 40° C./minute. The cooling of the object 44' may be accomplished in the manner described above.

After cooling, the 3D object 44'' exhibits a total dimension change ranging from about −4% to about 9%. In some examples, the total dimension change exhibited by the 3D object 44'' after cooling ranges from about 2% to about 9%. In other examples, the total dimension change exhibited by the 3D object 44'' after cooling ranges from about −4% to less than 0%. In still other examples, (i) the semi-crystalline or amorphous thermoplastic polymer is a polyamide 11 and the total dimension change exhibited by the 3D object 44'' after cooling ranges from about 5% to about 9%; or (ii) the semi-crystalline or amorphous thermoplastic polymer is a polyamide 12 and the total dimension change exhibited by the 3D object 44'' after cooling ranges from about 4% to about 6%; or (iii) the semi-crystalline or amorphous thermoplastic polymer is a polyamide 12-$TiO_2$ and the total dimension change exhibited by the 3D object 44'' after cooling ranges from about 4% to about 6%; or (iv) the semi-crystalline or amorphous thermoplastic polymer is a polyamide 12-GB and the total dimension change exhibited by the 3D object 44'' after cooling ranges from about 3% to about 5%; or (v) the semi-crystalline or amorphous thermoplastic polymer is a polypropylene and the total dimension change ranges exhibited by the 3D object 44'' after cooling from about −4% to about 7%.

Another example method 500 to form a 3D object will now be discussed in reference to FIGS. 6A and 6B. It is to be understood that the method 500 may be another example of the method 100.

In FIG. 6A, a layer 95 of the build material composition 16 is applied on the build area platform 12. The layer 95 may be applied in the same manner as described above.

The layer 95 of the build material composition 16 may be exposed to pre-heating in the manner described herein.

After the layer 95 is applied, and in some instances is pre-heated, the core fusing agent 28 is selectively applied on portion(s) 97 of the build material composition 16 in the layer 95. The portion(s) 97 of the layer 95 will form the first layer 99 of the 3D object being formed (not shown). As such, the core fusing agent 28 is selectively dispensed on the layer 95 according to a pattern of a cross-section for the layer 99.

After the core fusing agent 28 is applied on the portion(s) 97, the entire layer 95 of the build material composition 16 is exposed to electromagnetic radiation (shown as EMR Exposure between FIGS. 6A and 6B) in the manner previously described.

In this example, the core fusing agent 28 sufficiently elevates the temperature of the build material composition 16 in portion 97 to a temperature above the melting point of the semi-crystalline thermoplastic polymer, within or above the melting range of the semi-crystalline thermoplastic polymer, or above the softening point/glass transition temperature of the amorphous thermoplastic polymer of the build material composition 16, allowing coalescing/fusing (e.g., thermal merging, melting, binding, etc.) of the build material composition 16 to take place. Exposure to electromagnetic radiation forms the layer 99, as shown in FIG. 6B.

It is to be understood that portions of the build material composition 16 that do not have the core fusing agent 28 applied thereto do not absorb enough energy to coalesce/fuse.

After the layer 99 is formed, additional layer(s) may be formed thereon to create an example of the 3D object. For example, to form another layer, additional build material composition 16 may be applied on the layer 99. The core fusing agent 28 is then selectively applied on at least a portion of the additional build material composition 16, according to a pattern of a cross-section for the layer which is being formed. After the core fusing agent 28 is applied, the entire layer of the additional build material composition 16 is exposed to electromagnetic radiation in the manner previously described. The application of additional build material composition 16, the selective application of the core fusing agent 28, and the electromagnetic radiation exposure may be repeated a predetermined number of cycles to form the part.

In the example shown in FIGS. 6A and 6B, color may be imparted to the entire object by applying the coloring agent 30 with the core fusing agent 28 in each of the portions of the respective build material layers that form layers of the part.

It is to be understood that the methods 100, 500 may also be modified similarly to the method 300 in order to form colored layers (e.g., 52, 52', 52'') so that the part is completely encapsulated by colored layers.

Upon completion of the object, the object is cooled at a rate ranging from about greater than 0° C./minute to about 100° C./minute. In some examples, the object is cooled at a rate ranging from about greater than 0° C./minute to about 40° C./minute. The cooling of the object may be accomplished in the manner described above.

After cooling, the 3D object exhibits a total dimension change ranging from about −4% to about 9%. In some examples, the total dimension change exhibited by the 3D object after cooling ranges from about 2% to about 9%. In other examples, the total dimension change exhibited by the 3D object after cooling ranges from about −4% to less than 0%. In still other examples, (i) the semi-crystalline or amorphous thermoplastic polymer is a polyamide 11 and the total dimension change exhibited by the 3D object after cooling ranges from about 5% to about 9%; or (ii) the semi-crystalline or amorphous thermoplastic polymer is a polyamide 12 and the total dimension change exhibited by the 3D object after cooling ranges from about 4% to about 6%; or (iii) the semi-crystalline or amorphous thermoplastic polymer is a polyamide 12-TiO$_2$ and the total dimension change exhibited by the 3D object after cooling ranges from about 4% to about 6%; or (iv) the semi-crystalline or amorphous thermoplastic polymer is a polyamide 12-GB and the total dimension change exhibited by the 3D object after cooling ranges from about 3% to about 5%; or (v) the semi-crystalline or amorphous thermoplastic polymer is a polypropylene and the total dimension change ranges exhibited by the 3D object after cooling from about −4% to about 7%.

In any of the examples disclosed herein, when the 3D object 44, 44', 44" is complete, it may be removed from the build material platform 12, and any non-coalesced/non-fused build material composition 16 may be removed from the 3D object 44, 44', 44".

In any of the methods 100, 200, 300, 400, 500 disclosed herein, the non-patterned and non-coalesced/non-fused build material composition 16 may be reclaimed to be reused as build material in the printing of another 3D object. In some examples, the methods 100, 200, 300, 400, 500 may be accomplished in an air environment. As used herein, an "air environment" or an "environment containing air" refers to an environment that contains 20 vol % or more of oxygen.

Still further, in any of the methods 100, 200, 300, 400, 500 disclosed herein, different shaped objects may be printed in different orientations within the printing system 10. As such, while the object 44, 44', 44" may be printed from the bottom of the object 44, 44', 44" to the top of the object 44, 44', 44", it may alternatively be printed starting with the top of the object 44, 44', 44" to the bottom of the object 44, 44', 44", or from a side of the object 44, 44', 44" to another side of the object, 44, 44', 44", or at any other orientation that is suitable or desired for the particular geometry of the part being formed. Moreover, the fusing agent(s) 26, 26', 28 used for any particular layer or portion of a layer may depend, in part, on desired strength characteristics and/or aesthetics of the particular layer being formed.

Printing System

Figure 7:
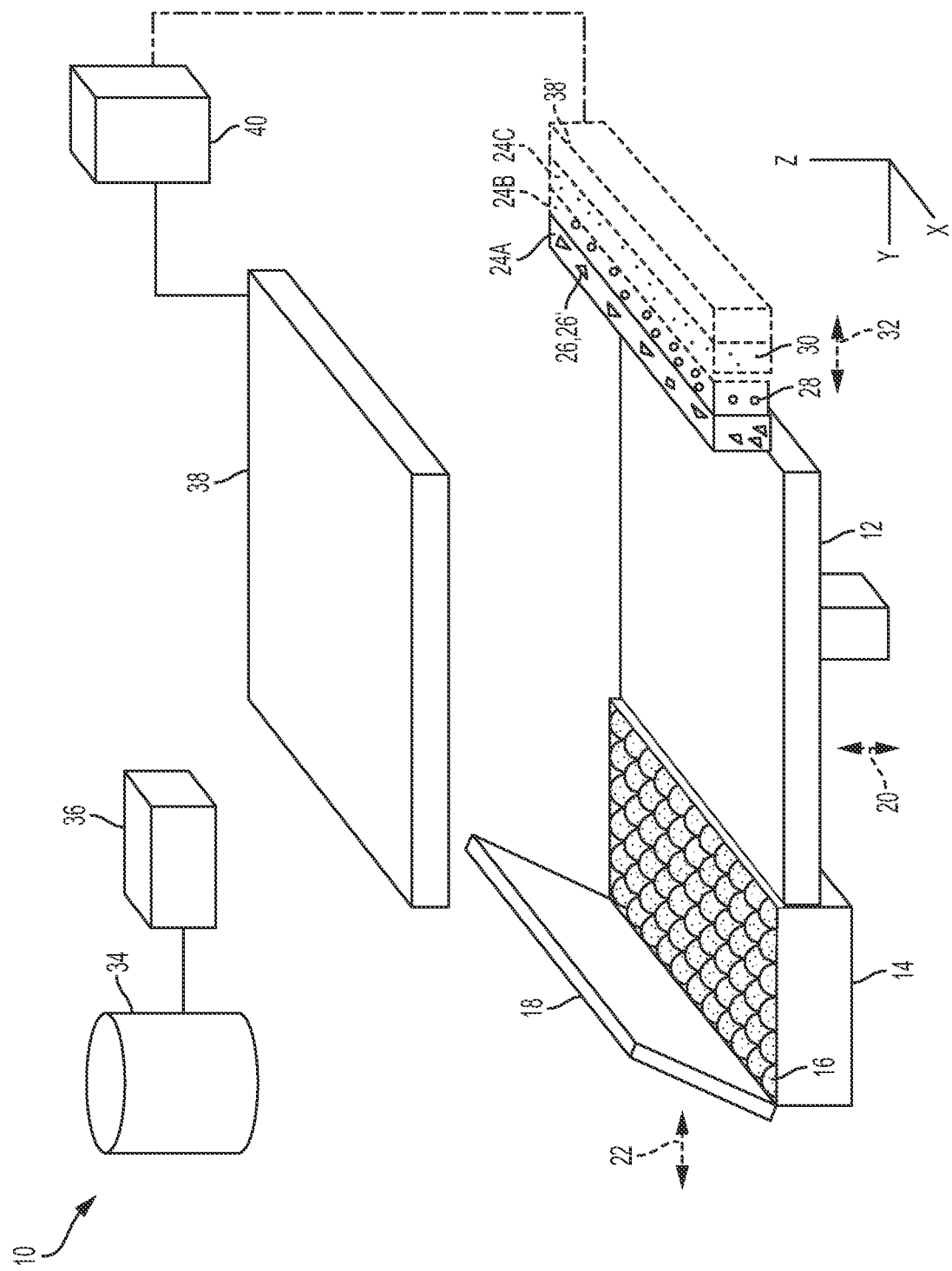
FIG. 7 is a simplified isometric and schematic view of an example of a 3D printing system disclosed herein.

Referring now to FIG. 7, an example of a 3D printing system 10 is schematically depicted. It is to be understood that the 3D printing system 10 may include additional components (some of which are described herein) and that some of the components described herein may be removed and/or modified. Furthermore, components of the 3D printing system 10 depicted in FIG. 7 may not be drawn to scale and thus, the 3D printing system 10 may have a different size and/or configuration other than as shown therein.

In an example, the three-dimensional (3D) printing system 10, comprises: a supply 14 of a build material composition 16 including a semi-crystalline or amorphous thermoplastic polymer having a predicted total dimension change during 3D printing ranging from about −4% to about 9%; a build material distributor 18; a supply of a fusing agent 26, 26', 28 selected from the group consisting of: (i) a core fusing agent 28 including an energy absorber having absorption at least at wavelengths ranging from 400 nm to 780 nm; and (ii) a primer fusing agent 26, 26' including an energy absorber having absorption at wavelengths ranging from 800 nm to 4000 nm and having transparency at wavelengths ranging from 400 nm to 780 nm; a first applicator 24A, 24B for selectively dispensing the fusing agent 26, 26', 28; a source 38, 38' of electromagnetic radiation; a controller 36; and a non-transitory computer readable medium having stored thereon computer executable instructions to cause the controller 36 to: utilize the build material distributor 18 to dispense the build material composition 16; utilize the first applicator 24A, 24B to selectively dispense the fusing agent 26, 26', 28 on at least a portion of the build material composition 16; and utilize the source 38, 38' of electromagnetic radiation to expose the build material composition 16 to radiation to coalesce/fuse the at least the portion of the build material composition 16.

Any example of the build material composition 16 may be used in the examples of the system 10.

In some examples, the 3D printing system 10 may further include a supply of another fusing agent 26, 26', 28; and another applicator 24A, 24B for selectively dispensing the other fusing agent 26, 26', 28. In these examples, the computer executable instructions may further cause the controller 36 to utilize the other applicator 24A, 24B to selectively dispense the other fusing agent 26, 26', 28.

In some other examples, the 3D printing system 10 may further include a supply of a coloring agent 30; and another applicator 24C for selectively dispensing the coloring agent 30. In these examples, the computer executable instructions may further cause the controller 36 to utilize the other applicator 24C to selectively dispense the coloring agent 30.

While not shown in FIG. 7, in still some other examples, the 3D printing system 10 may further include a supply of a detailing agent 42; and another applicator for selectively dispensing the detailing agent 42. In these examples, the computer executable instructions may further cause the controller 36 to utilize the other applicator to selectively dispense the detailing agent 42.

As shown in FIG. 7, the printing system 10 includes the build area platform 12, the build material supply 14 containing the build material composition 16 including the semi-crystalline or amorphous thermoplastic polymer disclosed herein, and the build material distributor 18.

As mentioned above, the build area platform 12 receives the build material composition 16 from the build material supply 14. The build area platform 12 may be integrated with the printing system 10 or may be a component that is separately insertable into the printing system 10. For example, the build area platform 12 may be a module that is available separately from the printing system 10. The build material platform 12 that is shown is one example, and could be replaced with another support member, such as a platen, a fabrication/print bed, a glass plate, or another build surface.

As also mentioned above, the build material supply 14 may be a container, bed, or other surface that is to position the build material composition 16 between the build material distributor 18 and the build area platform 12. In some examples, the build material supply 14 may include a surface upon which the build material composition 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the build material composition 16 from a storage location to a position to be spread onto the build area platform 12 or onto a previously formed layer of the 3D object. Another example of the mechanism for moving the build material composition 16 is a pneumatic conveying system.

As also mentioned above, the build material distributor 18 may be a blade (e.g., a doctor blade), a roller, a combination of a roller and a blade, and/or any other device capable of spreading the build material composition 16 over the build area platform 12 (e.g., a counter-rotating roller).

As shown in FIG. 7, the printing system 10 may include the applicator 24A, which may contain the fusing agent 26, 26'. As also shown, the printing system 10 may further include the applicator 24B, which may contain the fusing agent 28, and/or the applicator 24C, which may contain the coloring agent 30. While not shown, the printing system 10 may further include another applicator (which may contain the detailing agent 42).

The applicator(s) 24A, 24B, 24C may be scanned across the build area platform 12 in the directions indicated by the arrow 32, e.g., along the y-axis. The applicator(s) 24A, 24B, 24C may be, for instance, a thermal inkjet printhead, a piezoelectric printhead, a continuous inkjet printhead, etc., and may extend a width of the build area platform 12. While the each applicator 24A, 24B, 24C is shown in FIG. 7 as a single applicator, it is to be understood that each applicator 24A, 24B, 24C may include multiple applicators that span the width of the build area platform 12. Additionally, the applicators 24A, 24B, 24C may be positioned in multiple printbars. The applicator(s) 24A, 24B, 24C may also be scanned along the x-axis, for instance, in configurations in which the applicator(s) 24A, 24B, 24C do/does not span the width of the build area platform 12 to enable the applicator(s) 24A, 24B, 24C to deposit the respective agents 26, 26', 28, 30, 42 over a large area of the build material composition 16. The applicator(s) 24A, 24B, 24C may thus be attached to a moving XY stage or a translational carriage (neither of which is shown) that moves the applicator(s) 24A, 24B, 24C adjacent to the build area platform 12 in order to deposit the respective agents 26, 26', 28, 30, 42 in predetermined areas of the build material layer(s) that has/have been formed on the build area platform 12 in accordance with the methods 100, 200, 300, 400, 500 disclosed herein. The applicator(s) 24A, 24B, 24C may include a plurality of nozzles (not shown) through which the respective agents 26, 26', 28, 30, 42 are to be ejected.

The applicator(s) 24A, 24B, 24C may deliver drops of the respective agents 26, 26' 28, 30, 42 at a resolution ranging from about 300 dots per inch (DPI) to about 1200 DPI. In other examples, the applicator(s) 24A, 24B, 24C may deliver drops of the respective agents 26, 26', 28, 30, 42 at a higher or lower resolution. The drop velocity may range from about 10 m/s to about 24 m/s and the firing frequency may range from about 1 kHz to about 48 kHz. In one example, the volume of each drop may be on the order of about 3 picoliters (pL) to about 18 pL, although it is contemplated that a higher or lower drop volume may be used. In some examples, the applicator(s) 24A, 24B, 24C is/are able to deliver variable drop volumes of the respective agents 26, 26', 28, 30, 42. One example of a suitable printhead has 600 DPI resolution and can deliver drop volumes ranging from about 6 pL to about 14 pL.

Each of the previously described physical elements may be operatively connected to a controller 36 of the printing system 10. The controller 36 may process print data that is based on a 3D object model of the 3D object/part to be generated. In response to data processing, the controller 36 may control the operations of the build area platform 12, the build material supply 14, the build material distributor 18, and the applicator(s) 24A, 24B, 24C. As an example, the controller 36 may control actuators (not shown) to control various operations of the 3D printing system 10 components. The controller 36 may be a computing device, a semiconductor-based microprocessor, a central processing unit (CPU), an application specific integrated circuit (ASIC), and/or another hardware device. Although not shown, the controller 36 may be connected to the 3D printing system 10 components via communication lines.

The controller 36 manipulates and transforms data, which may be represented as physical (electronic) quantities within the printer's registers and memories, in order to control the physical elements to create the 3D object. As such, the controller 36 is depicted as being in communication with a data store 34. The data store 34 may include data pertaining to a 3D object to be printed by the 3D printing system 10. The data for the selective delivery of the build material composition 16, the fusing agent 26, 26', 28, etc. may be derived from a model of the 3D object to be formed. For instance, the data may include the locations on each build material layer that the first applicator 24A, 24B is to deposit the fusing agent 26, 26', 28. In one example, the controller 36 may use the data to control the first applicator 24A, 24B to selectively apply the fusing agent 26, 26', 28. The data store 34 may also include machine readable instructions (stored on a non-transitory computer readable medium) that are to cause the controller 36 to control the amount of build material composition 16 that is supplied by the build material supply 14, the movement of the build area platform 12, the movement of the build material distributor 18, the movement of the applicator(s) 24A, 24B, 24C, etc.

As shown in FIG. 7, the printing system 10 may also include a source 38, 38' of electromagnetic radiation. In some examples, the source 38 of electromagnetic radiation may be in a fixed position with respect to the build material platform 12. The source 38 in the fixed position may be a conductive heater or a radiative heater that is part of the printing system 10. These types of heaters may be placed below the build area platform 12 (e.g., conductive heating from below the platform 12) or may be placed above the build area platform 12 (e.g., radiative heating of the build material layer surface). In other examples, the source 38' of electromagnetic radiation may be positioned to apply radiation to the build material composition 16 immediately after the fusing agent 26, 26', 28 has been applied thereto. In the example shown in FIG. 7, the source 38' of electromagnetic radiation is attached to the side of the applicators 24A, 24B, 24C which allows for patterning and heating/exposing to radiation in a single pass.

The source 38, 38' of electromagnetic radiation may emit radiation having wavelengths ranging from about 400 nm to about 4000 nm. As one example, the electromagnetic radiation may range from about 800 nm to about 1400 nm. As another example, the electromagnetic radiation may range from about 400 nm to about 1200 nm. As still another example, the electromagnetic radiation may be blackbody radiation with a maximum intensity at a wavelength of about 1100 nm. The source 38, 38' of electromagnetic radiation may be infrared (IR) or near-infrared light sources, such as IR or near-IR curing lamps, IR or near-IR light emitting diodes (LED), or lasers with the desirable IR or near-IR electromagnetic wavelengths.

The source 38, 38' of electromagnetic radiation may be operatively connected to a lamp/laser driver, an input/output temperature controller, and temperature sensors, which are collectively shown as radiation system components 40. The radiation system components 40 may operate together to control the source 38, 38' of electromagnetic radiation. The temperature recipe (e.g., radiation exposure rate) may be submitted to the input/output temperature controller. During heating, the temperature sensors may sense the temperature of the build material composition 16, and the temperature measurements may be transmitted to the input/output temperature controller. For example, a thermometer associated with the heated area can provide temperature feedback. The input/output temperature controller may adjust the source 38, 38' of electromagnetic radiation power set points based on any difference between the recipe and the real-time measurements. These power set points are sent to the lamp/laser drivers, which transmit appropriate lamp/laser voltages to the source 38, 38' of electromagnetic radiation. This is one example of the radiation system components 40, and it is to be understood that other radiation source control systems may be used. For example, the controller 36 may be configured to control the source 38, 38' of electromagnetic radiation.

While not shown, the printing system 10 may also include a cooling system. In an example, the build area platform 12 may be mobile, and may be moved into the cooling system. The cooling system may include controllers and a cooling mechanism to achieve cooling of the 3D object at the desirable cooling rate.

To further illustrate the present disclosure, an example is given herein. It is to be understood that this example is provided for illustrative purposes and is not to be construed as limiting the scope of the present disclosure.

EXAMPLE

Five examples of the build material composition disclosed herein were prepared. The first example build material (labeled "PA 11" in FIG. 8 and Table 1) included a polyamide 11. The second example build material (labeled "PA 12" in FIG. 8 and Table 1) included a polyamide 12. The third example build material (labeled "PA 12-TiO$_2$" in FIG. 8) included a polyamide 12-TiO$_2$ in which titanium dioxide was included in an amount of about 3 wt %. The fourth example build material (labeled "PA 12-GB" in FIG. 8 and Table 1) included a polyamide 12-GB in which glass beads were encapsulated by the polyamide 12 and the weight ratio of the glass beads to the polyamide 12 was 40:60. The fifth example build material (labeled "PP" in FIG. 8 and Table 1) included a polypropylene (AdSint™ PP available from Advanc 3D materials). Each example build material included less than 5 wt % of additives (i.e., antioxidant(s), whitener(s), antistatic agent(s), and flow aid(s)). It is to be understood that the titanium dioxide included in the third example build material were not part of the less than 5 wt % of additives. It is also to be understood that the glass beads included in the fourth example build material were not part of the less than 5 wt % of additives.

Several samples of each of the example build material compositions (i.e., each of the example semi-crystalline or amorphous thermoplastic polymers) were tested. More particularly, using thermomechanical analysis (TMA), the predicted total dimension change of each of the samples was measured. Each sample was placed, at room temperature, in an aluminum cylindrical vessel and lightly tapped with a quartz probe (having a 0.001 N to 1 N force range) to settle the sample. Then, the height of the cylindrical vessel that the sample filled was measured using a linear variable differential transducer (LVDT), with a 15 nm sensitivity. The height was used to calculate the original volume of the sample. Then, the sample was heated at a heating rate of 10° C./minute until the sample melted. After melting, the sample was cooled until the polymer sample reached room temperature. Different samples of the respective polymers were cooled at different cooling rates including: i) from greater than 0° C./minute to about 2° C./minute, ii) 5° C./minute, iii) 10° C./minute, iv) 20° C./minute, and v) 40° C./minute. The furnace and chamber containing the sample were plumbed with helium during the heating and cooling for an inert atmosphere with high thermal conductivity. After cooling, the height of the cylindrical vessel that the sample filled was measured (using the linear variable differential transducer) and used to calculate the volume of the sample after melting and cooling. The original volume and the volume after melting and cooling were used to calculate the predicted total dimension change for each sample. The predicted total dimension change ($\Delta$) was calculated by dividing the difference between the original volume ($V_1$) and the volume after melting and cooling ($V_2$) by the original volume ($V_1$) and multiplying by 100 (i.e., $\Delta=[(V_1-V_2)/V_1]100$).

Figure 8:
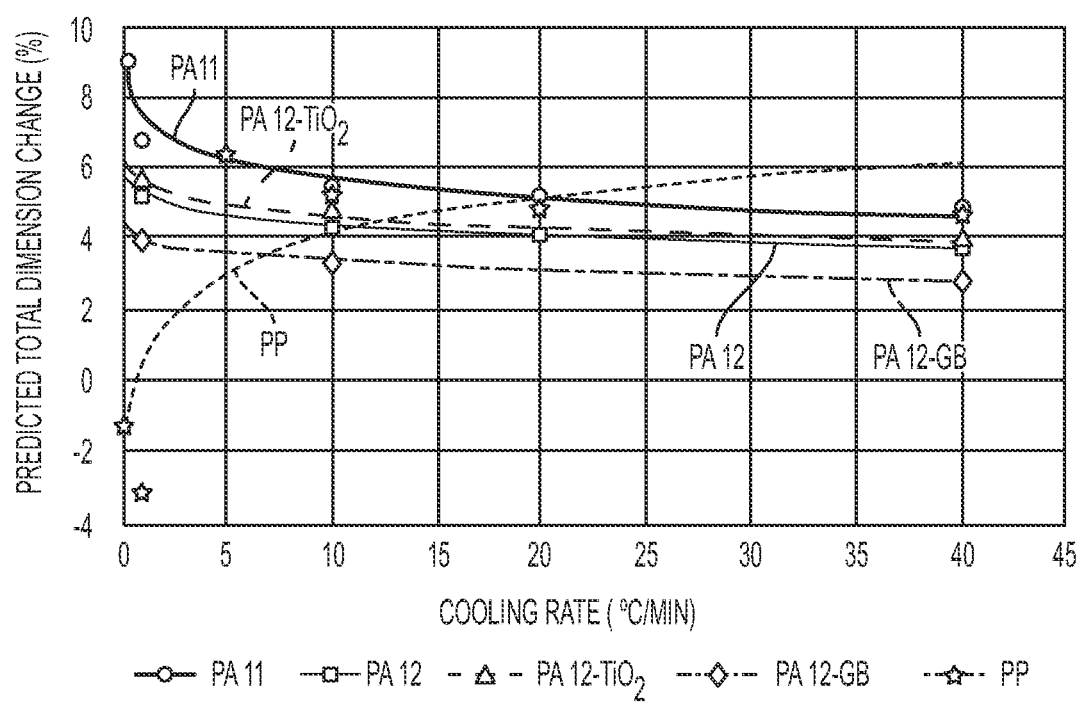
FIG. 8 is a graph showing predicted total dimension change as a function of cooling rate for example build material compositions (PA 11, PA 12, PA 12-TiO$_2$, PA 12-GB, and PP), with the predicted total dimension change (in %) shown on the y-axis, and the cooling rate (in ° C./minute) shown on the x-axis.

The predicted total dimension change of each of the samples is shown in FIG. 8. In FIG. 8, the predicted total dimension change (in %) is shown on the y-axis, and the cooling rate (in ° C./minute) to which each sample was exposed is shown on the x-axis. The example build material composition of each sample is also indicated in FIG. 8. As illustrated, the results of TMA indicate that each of the build materials exhibits minimal predicted shrinkage or expansion, and thus may be suitable for use in the printing methods disclosed herein.

Several 3D objects were printed with each of the first, second, fourth, and fifth example build material compositions using examples of the 3D printing methods disclosed herein. Each 3D object was printed on a large format 3D printer with an example fusing agent that included carbon black as the energy absorber. The fusing agent was not modified for the various build materials.

Each of the 3D objects was sufficiently fused/coalesced. Further, the non-patterned build material adjacent to each of the 3D objects was able to be removed and separated from the completed 3D object. Thus, each of the example build material compositions was shown to be a suitable build material composition for the 3D printing methods disclosed herein.

Additionally, the elongation at break, ultimate tensile strength, Young's Modulus, and impact strength of the 3D objects formed from the first, second, fourth, and fifth example build material compositions were measured using Instron testing equipment. Further, the total dimensional change of the 3D objects formed from the first, second, fourth, and fifth example build material compositions was empirically determined as described herein. A standardized plot having known X, Y, and Z values was used to print the various parts. In this example, the X (e.g., length) and Y (e.g., width) values of the standardized plot were the same. After each part was printed in accordance with the standardized plot and cooled at a cooling rate ranging from 0.05° C./minute to 0.2° C./minute (depending on the location of the region of the part in print bed), the length and width of the actual parts were measured. The variation of the measured length and width from the standardized plot X (length) and Y (width) values was determined, and the percent change was calculated. These calculated percent changes are shown in Table 1 as the total X or total Y dimensional change. In Table 1, each 3D object is identified by build material composition used to form the 3D object.

TABLE 1

| Build material composition used to form the 3D object | Elongation at Break (%) | Ultimate Tensile Strength (MPa) | Young's Modulus (MPa) | Impact Strength (kJ/m$^2$) | Total X or total Y dimensional change (%) |
| --- | --- | --- | --- | --- | --- |
| PA 11 | 50 | 50 | 1800 | 6 | 4.25 |
| PA 12 | 20 | 48 | 1800 | 3.5 | 3.54 |

TABLE 1-continued

| Build material composition used to form the 3D object | Elongation at Break (%) | Ultimate Tensile Strength (MPa) | Young's Modulus (MPa) | Impact Strength (kJ/m$^2$) | Total X or total Y dimensional change (%) |
|---|---|---|---|---|---|
| PA 12-GB | 6.5 | 30 | 2800 | 2.7 | 2.85 |
| PP | 30 | 27 | 1350 | 3.5 | 4.10 |

As shown in Table 1, the mechanical properties (i.e., elongation at break, ultimate tensile strength, Young's Modulus, and impact strength) of the 3D objects formed from the first, second, fourth, and fifth example build material compositions are acceptable for 3D printed objects. Thus, these results further indicate that a build material composition including a semi-crystalline or amorphous thermoplastic polymer having a total dimension change during 3D printing within the ranges set forth herein is a suitable build material composition for the 3D printing methods disclosed herein without adjusting the fusing agent composition.

As also shown in Table 1, the total dimensional change (in the X and Y dimensions) of the 3D objects formed from the first, second, fourth, and fifth example build material compositions are acceptable for 3D printed objects. Thus, these results further indicate that a build material composition including a semi-crystalline or amorphous thermoplastic polymer having a predicted total dimension change during 3D printing within the ranges set forth herein is a suitable build material composition for the 3D printing methods disclosed herein without adjusting the fusing agent composition.

Further, the total X and Y dimensional change during 3D printing of the 3D objects formed from the first, second, fourth, and fifth example build material compositions (Table 1) were about the same as (i.e., within 10% of) the predicted total dimension change of the first, second, fourth, and fifth example build material compositions exposed to TMA (FIG. 8). This confirms that the TMA results correlate with, and thus are an accurate reflection of, the total dimension change that was exhibited during 3D printing.

It is to be understood that the ranges provided herein include the stated range and any value or sub-range within the stated range, as if such values or sub-ranges were explicitly recited. For example, from about −4% to about 9% should be interpreted to include not only the explicitly recited limits of from about −4% to about 9%, but also to include individual values, such as about −3.5%, about −1.67%, about 0%, about 1.75%, about 4.15%, about 7.927%, etc., and sub-ranges, such as from about −3.53% to about 5%, from about −1.25% to about 7.2%, from about 1.75% to about 8.79%, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for three-dimensional (3D) printing, comprising:
   iteratively applying individual build material layers of a build material composition comprising a semi-crystalline or amorphous thermoplastic polymer;
   selectively applying a fusing agent to at least one of the build material layers to define individually patterned layers;
   iteratively exposing the individually patterned layers to an electromagnetic radiation to form individual object layers; and
   upon completion of a 3D object comprising the individual object layers, cooling the 3D object at a rate of 0.01 degrees Celsius per minute to 1 degree Celsius per minute.

2. The method of claim 1, wherein the 3D object is cooled at a rate of 0.05 degrees Celsius per minute to 0.2 degree Celsius per minute.

3. The method of claim 1, wherein a rate of the cooling is a function of a location of a region of the 3D part in a print bed.

4. The method of claim 1, wherein the semi-crystalline or amorphous thermoplastic polymer is selected from a group of: polyamide 11, polyamide 12, polyamide 12-GB, polyamide 12-TiO$_2$, polypropylene, polyurethane, acrylonitrile butadiene styrene, and polycarbonate.

5. The method of claim 1, wherein the fusing agent is applied to at least one of the build material layers based on a 3D object model.

6. The method of claim 1, wherein the fusing agent comprises a core fusing agent including an energy absorber having absorption at least at wavelengths ranging from 400 nanometers (nm) to 780 nm.

7. The method of claim 6, wherein the core fusing agent is applied to form at least one inner layer of the 3D object.

8. The method of claim 1, wherein the fusing agent comprises a primer fusing agent including an energy absorber comprising an inorganic pigment selected from a group of: lanthanum hexaboride, tungsten bronzes, indium tin oxide, aluminum zinc oxide, ruthenium oxide, silver, gold, platinum, iron pyroxenes, modified iron phosphates ($A_xFe_yPO_4$), modified copper pyrophosphates ($A_xCu_yP_2O_7$), and combinations thereof.

9. The method of claim 8, wherein the primer fusing agent is applied to form at least one outer layer of the 3D object.

10. The method of claim 1, wherein the fusing agent is applied to a plurality of the individual build material layers based on a 3D object model.

11. The method of claim 10, wherein the fusing agent comprises a core fusing agent including an energy absorber having absorption at least at wavelengths ranging from 400 nanometers (nm) to 780 nm and a primer fusing agent including an energy absorber comprising an inorganic pigment selected from a group of: lanthanum hexaboride, tungsten bronzes, indium tin oxide, aluminum zinc oxide, ruthenium oxide, silver, gold, platinum, iron pyroxenes, modified iron phosphates ($A_xFe_yPO_4$), modified copper pyrophosphates ($A_xCu_yP_2O_7$), and combinations thereof.

12. The method of claim 11, further comprising:
    determining a first number of layers of the plurality of the individual build material layers to receive the core fusing agent and a second number of layers of the individual build material layers to receive the primer fusing agent based on the 3D object model.

13. The method of claim 12, further comprising:
applying the core fusing agent the first number of layers; and
applying the primer fusing agent to the second number of layers.

14. The method of claim 1, wherein each of the individual object layers is selected from a group of: a core layer, a primer layer, or a layer including a core portion and a primer portion.

15. The method of claim 1, wherein the 3D object exhibits a total dimension change ranging from −4% to 9% after the 3D object is cooled.

16. The method of claim 1, further comprising:
exposing the build material composition to thermomechanical analysis to identify a predicted total dimension change of the build material composition prior to iteratively applying the individual build material layers.

17. The method of claim 1, further comprising:
applying a coloring agent on an outermost layer of the individual object layers.

18. The method of claim 17, further comprising:
applying a detailing agent on the outermost layer that receives the coloring agent.

19. The method of claim 1, wherein the cooling is performed while the 3D object is maintained in an environment having a temperature ranging from 15 degrees Celsius to 30 degrees Celsius.

20. The method of claim 1, further comprising:
pre-heating the individual build material layers from about 5 degrees Celsius to about 50 degrees Celsius.

\* \* \* \* \*